(12) United States Patent
Saha et al.

(10) Patent No.: US 12,002,136 B2
(45) Date of Patent: Jun. 4, 2024

(54) STYLE TRY-ON WITH REVERSE GANs

(71) Applicant: L'OREAL, Paris (FR)

(72) Inventors: Rohit Saha, Toronto (CA); Brendan Duke, Toronto (CA)

(73) Assignee: L'OREAL, Paris (FR)

( * ) Notice: Subject to any disclaimer, the term of this patent is extended or adjusted under 35 U.S.C. 154(b) by 162 days.

(21) Appl. No.: 17/685,675

(22) Filed: Mar. 3, 2022

(65) Prior Publication Data

US 2022/0284646 A1 Sep. 8, 2022

Related U.S. Application Data

(60) Provisional application No. 63/155,842, filed on Mar. 3, 2021.

(30) Foreign Application Priority Data

Mar. 2, 2022 (FR) ........................................ 2201829

(51) Int. Cl.
*G06T 11/60* (2006.01)
*G06N 3/08* (2023.01)
(Continued)

(52) U.S. Cl.
CPC ............... *G06T 11/60* (2013.01); *G06N 3/08* (2013.01); *G06Q 30/0631* (2013.01); *G06T 5/50* (2013.01); *G06T 7/11* (2017.01); *G06F 3/0482* (2013.01); *G06T 2200/24* (2013.01); *G06T 2207/20081* (2013.01); *G06T 2207/20084* (2013.01);
(Continued)

(58) Field of Classification Search
CPC ... G06T 11/60; G06T 5/50; G06T 7/11; G06T 2200/24; G06T 2207/20081; G06T 2207/20084; G06T 2207/20212; G06T 2207/30201; G06T 2207/20076; G06T 2207/30196; G06T 7/00; G06T 7/10;
(Continued)

(56) References Cited

U.S. PATENT DOCUMENTS

2015/0052008 A1* 2/2015 Campbell ............... G06Q 50/01
705/26.8

OTHER PUBLICATIONS

Romero, Andres, et al., "SMILE: Semantically-guided Multi-attribute Image and Layout Editing", arXiv preprint arXiv:2010.02315, Oct. 5, 2020 (Year: 2020).*

(Continued)

*Primary Examiner* — William A Beutel
(74) *Attorney, Agent, or Firm* — Oblon, McClelland, Maier & Neustadt, L.L.P.

(57) ABSTRACT

Hairstyle transfer is challenging due to hair structure differences in the source and target hair. Latent Optimization of Hairstyles via Orthogonalization (LOHO) is an optimization-based approach using GAN inversion to infill missing hair structure details in latent space during hairstyle transfer. Hair is decomposed into three attributes: perceptual structure, appearance, and finer style, and includes tailored losses to model each of these attributes independently. Two-stage optimization and gradient orthogonalization enable disentangled latent space optimization of the three hair attributes. Using LOHO for latent space manipulation, users can synthesize novel photorealistic images by manipulating hair attributes either individually or jointly, transferring the desired attributes from reference hairstyles.

18 Claims, 11 Drawing Sheets

(51) Int. Cl.
*G06Q 30/0601* (2023.01)
*G06T 5/50* (2006.01)
*G06T 7/11* (2017.01)
*G06F 3/0482* (2013.01)

(52) U.S. Cl.
CPC .............. *G06T 2207/20212* (2013.01); *G06T 2207/30201* (2013.01)

(58) Field of Classification Search
CPC .... G06T 11/001; G06N 3/08; G06Q 30/0631; G06F 3/0482
See application file for complete search history.

(56) References Cited

OTHER PUBLICATIONS

Yujun Shen, Jinjin Gu, Xiaoou Tang, Bolei Zhou, "Interpreting the Latent Space of GANs for Semantic Face Editing", Proceedings of the IEEE/CVF Conference on Computer Vision and Pattern Recognition (CVPR), 2020, pp. 9243-9252 (Year: 2020).*
Rameen Abdal Kaust et al., "Image2StyleGAN: How to Embed Images Into the StyleGAN Latent Space?", Sep. 3, 2019, 23 pages.
Rameen Abdal Kaust et al., "Image2StyleGAN++: How to Edit the Embedded Images?", Aug. 7, 2020, 18 pages.
Andrew Brock et al., "Large Scale GAN Training for High Fidelity Natural Image Systehsis", Feb. 25, 2019, 35 pages.
Adrian Bulat, et al., "How far are we from solving the 2D & 3D Face Alignment problem? (and a dataset of 230,000 3D facial landmarks)", Sep. 7, 2017, 14 pages.
Egor Burkov et al., "Neural Head Reenactment with Latent Pose Descriptors", Oct. 30, 2020, 15 pages.
Menglei Chai et al., "High-Quality Hair Modeling from a Single Portrait Photo", Oct. 26, 2015, 10 pages.
Menglei Chai et al., "Dynamic Hair Manipulation in Images and Videos", Jul. 21, 2013, 8 pages.
Menglei Chai et al., "Single-View Hair Modeling for Portrait Manipulation", Jan. 1, 2012, 8 pages.
Caroline Chan et al., "Everybody Dance Now", Aug. 27, 2019, 12 pages.
Leon A. Gatys et al., "Image Style Transfer Using Convolutional Neural Networks", Dec. 12, 2016, 10 pages.
Ke Gong et al., "Graphonomy: Universal Human Parsing via Graph Transfer Learning", Apr. 9, 2019, 10 pages.
Ian J. Goodfellow et al., "Generative Adversarial Nets", Jun. 10, 2014, 9 pages.
Shanyan Guan et al. "Collaborative Learning for Faster SytleGAN Embedding", Jul. 3, 2020, 10 pages.
Martin Heusel et al., "GANs Trained by a Two Time-Scale Update Rule Converge to a Local Nash Equilibrium", Jan. 12, 2018, 38 pages.
Phillip Isola et al., "Image-to-Image Translation with Conditional Adversarial Networks", Nov. 26, 2018, 17 pages.
Youngjoo Jo et al., "SC-FEGAN: Face Editing Generative Adversarial Network with User's Sketch and Color", Feb. 18, 2019, 10 pages.
Justin Johnson et al., "Perceptual Losses for Real-Time Style Transfer and Super-Resolution", Mar. 27, 2016, 18 pages.
Tero Karras et al., "Progressive Growing of GANs for Improved Quality, Stability, and Variation", Feb. 26, 2018, 26 pages.
Tero Karras et al., "A Style-Based Generator Architecture for Generative Adversarial Networks", Mar. 29, 2019, 12 pages.
Tero Karras et al., "Analyzing and Improving the Image Quality of StyleGAN", Mar. 23, 2020, 21 pages.
Lingyu Wei et al., "Real-Time Hair Rendering using Sequential Adversarial Networks", Sep. 8, 2018, 18 pages.
Diederik P. Kingma et al., "ADAM: A Method for Stochastic Optimization", Jan. 30, 2017, 15 pages.
Cheng-Han Lee et al., "MaskGAN: Towards Diverse and Interactive Facial Image Manipulation", Apr. 1, 2020, 20 pages.
Jianan Li et al., "Perceptual Generative Adversarial Networks for Small Object Detection", Jun. 20, 2017, 9 pages.
Taesung Park et al., "Semantic Image Synthesis with Spatially-Adaptive Normalization", Nov. 5, 2019, 19 pages.
Stanislav Pidhorsky, et al., "Adversarial Latent Autoencoders", Apr. 9, 2020, 10 pages.
Elad Richardson et al., "Encoding in Style: a StyleGAN Encoder for Image-to-Image Translation", Aug. 3, 2020, 10 pages.
Karen Simonyan et al., "Very Deep Convolutional Networks for Large-Scale Image Recognition", Apr. 10, 2015, 14 pages.
Christian Szegedy et al., "Rethinking the Inception Architecture for Computer Vision", Dec. 11, 2015, 10 pages.
Zhentao Tan et al. "MichiGAN: Multi-Input-Conditioned Hair Image Generation for Portrait Editing", Oct. 30, 2020, 13 pages.
Andrew Tao et al., "Hierarchical Multi-Scale Attention for Semantic Segmentation", May 21, 2020, 11 pages.
Ting-Chun Wang et al., "High-Resolution Image Synthesis and Sematic Manipulation with Conditional GANs", Aug. 20, 2018, 14 pages.
Ting-Chun Wang et al., "Few-shot Video-to-Video Synthesis", Oct. 28, 2019, 14 pages.
Ting-Chun Wang et al., "Video-to-Video Synthesis", Dec. 3, 2018, 14 pages.
Yanlin Weng et al., "Hair Interpolation for Portrait Morphing", vol. 32 (2013), No. 7, 6 pages.
Jaihui Yu et al., "Free-Form Image Inpainting with Gated Convolution", Oct. 22, 2019, 17 pages.
Yuhui Yuan et al., "Segmentation Transformer: Object-Contextual Representations for Semantic Segmentation", Apr. 30, 2021, 21 pages.
Egor Zakharov et al., "Few-Shot Adversarial Learning of Realistic Neural Talking Head Models", Sep. 25, 2019, 21 pages.
Richard Zhang et al., "The Unreasonable Effectiveness of Deep Features as a Perceptual Metric", Apr. 10, 2018, 14 pages.
Jun-Yan Zhu et al., "Unpaired Image-to-Image Translation using Cycle-Consistent Adversarial Networks", Aug. 24, 2020, 18 pages.
Jiapeng Zhu et al., "In-Domain GAN Inversion for Real Image Editing", Jul. 16, 2020, 31 pages.
Preliminary Report and Written Opinion dated Jan. 19, 2023, in corresponding French Patent Application No. FR2201829 (with English Translation of Category of Cited Documents), 8 pages.

* cited by examiner 600A  600B  600C  600D

STYLE TRY-ON WITH REVERSE GANs

CROSS-REFERENCE

This application claims a domestic benefit of U.S. Provisional Application No. 63/155,842 filed Mar. 3, 2021, the entire contents of which are incorporated herein by reference. This application also claims priority to French Patent Application No. 2201829, filed Mar. 2, 2022, the entire contents of which are incorporated herein by reference.

FIELD

This application relates to improving computer processing, image processing, and neural networks for image processing and more particularly to systems, methods and techniques for style try-on with reverse GANs, particularly hairstyle try-on.

BACKGROUND

Computer processing of images using neural networks has opened new avenues for effects simulation. Progress in generative adversarial networks (GANs) enables both conditional [15, 32] and unconditional [19] synthesis of photorealistic images. In parallel, recent works have achieved impressive latent space manipulation by learning disentangled feature representations [26], enabling photorealistic global and local image manipulation.

However, achieving controlled manipulation of attributes of the synthesized images while maintaining photorealism remains an open challenge.

SUMMARY

Style transfer, including hairstyle transfer, is challenging due to structure differences in the source and target objects such as hair. In an embodiment, Latent Optimization of Hairstyles via Orthogonalization (LOHO) is an optimization-based approach using GAN inversion to infill missing hair structure details in latent space during hairstyle transfer. Hair is decomposed into three attributes: perceptual structure (e.g. shape), appearance, and finer style, and includes tailored losses to model each of these attributes independently. Two-stage optimization and gradient orthogonalization enable disentangled latent space optimization of the three hair attributes. Using LOHO for latent space manipulation, users can synthesize novel photorealistic images by manipulating hair attributes either individually or jointly, transferring the desired attributes from reference hairstyles. In an embodiment, the LOHO approach (e.g. two-stage optimization and gradient orthogonalization to disentangle latent space optimization of style attributes) is generalizable to other style transfers such as to clothing.

DETAILED DESCRIPTION

Various embodiments are detailed herein in relation to hairstyle transfer. It will be understood by persons of ordinary skill in the art that other style transfer tasks may be implemented using the techniques, methods and apparatus described herein and as adapted to the other style transfer task.

In an embodiment, users are enabled to make semantic and structural edits to their portrait image with fine-grained control. As a particular challenging and commercially appealing example, hairstyle transfer is evaluated and described herein, wherein a user can transfer hair attributes from multiple independent source images to manipulate their own portrait image. In an embodiment, Latent Optimization of Hairstyles via Orthogonalization (LOHO), is a two-stage optimization process in the latent space of a generative model, such as a generative adversarial network (GAN) [12, 18]. An example technical contribution is that attribute transfer is controlled by orthogonalizing the gradients of transferred attributes so that the application of one attribute does not interfere with the others.

Previous work on hairstyle transfer [30] produced realistic transfer of hair appearance using a complex pipeline of GAN generators, each specialized for a specific task such as hair synthesis or background inpainting. However, the use of pretrained inpainting networks to fill holes left over by misaligned hair masks results in blurry artifacts. To produce more realistic synthesis from transferred hair shape, missing shape and structure details are infilled, according to an embodiment, by invoking the prior distribution of a single GAN pretrained to generate faces.

LOHO achieves photorealistic hairstyle transfer even under said source-target hair misalignment. LOHO directly optimizes the extended latent space and the noise space of a pretrained StyleGANv2 [20]. Using carefully designed loss functions, the LOHO approach decomposes hair into three attributes: perceptual structure (e.g. shape), appearance, and finer style. Each of these attributes is then modeled individually, thereby allowing better control over the synthesis process. Additionally, LOHO significantly improves the quality of synthesized images by employing two-stage optimization, where each stage optimizes a subset of losses in the objective function. Some of the losses, due to their similar design, are optimized sequentially and not jointly under the LOHO approach. Finally, LOHO uses gradient orthogonalization to explicitly disentangle hair attributes during the optimization process.

Figure 1A:
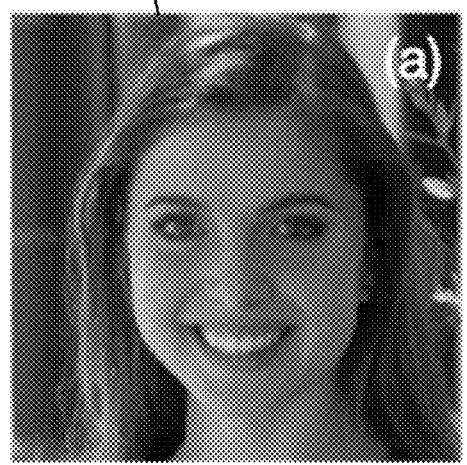
FIGS. 1A, 1B, 1C, 1D and 1E are images 100, 102, 104, 106, and 108 to illustrate hairstyle transfer samples synthesized in accordance with an embodiment.
Figure 1D:
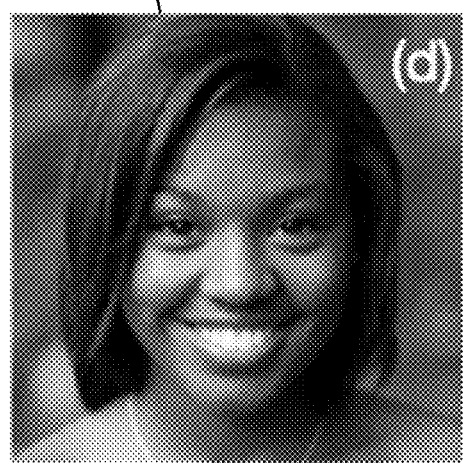
Figure 1B:
Figure 1E:
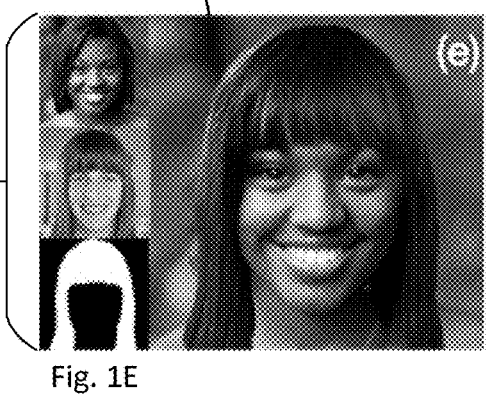

FIGS. 1A, 1B, 1C, 1D and 1E are images 100, 102, 104, 106, and 108 to illustrate hairstyle transfer samples synthesized using LOHO in accordance with an embodiment. For given portrait images 100 and 106 of FIGS. 1A and 1D, LOHO is capable of manipulating hair attributes based on multiple input conditions. Inset images (e.g. 102A, 104A, and 18A) represent the target hair attributes in the order: appearance and finer style, structure, and shape. LOHO can transfer appearance and finer style (e.g. as shown at FIG. 1B), and perceptual structure (e.g. as shown at FIG. 1B) while keeping the background unchanged.

Figure 1C:

Additionally, LOHO can change multiple hair attributes simultaneously and independently (e.g. as shown at FIG. 1C).

In accordance with features of the LOHO approach, there is provided:

- a novel approach to perform hairstyle transfer by optimizing StyleGANv2's extended latent space and noise space.
- an objective function that includes multiple losses catered to model each key hairstyle attribute.
- a two-stage optimization strategy that leads to significant improvements in the photorealism of synthesized images.
- the introduction of a gradient orthogonalization, a general method to jointly optimize attributes in latent space without interference. The effectiveness of gradient orthogonalization is demonstrated both qualitatively and quantitatively.
- hairstyle transfer on in-the-wild portrait images with evaluation using computed Fréchet Inception Distance (FID) score. FID is used to evaluate generative models by calculating the distance between Inception [29] features for real and synthesized images in the same domain. The computed FID score shows that the framework and associated methods and techniques in accordance with the embodiments can approach outperform the current state-of-the-art (SOTA) hairstyle transfer results.

Related Work

Generative Adversarial Networks. Generative models, in particular GANs, have been very successful across various computer vision applications such as image-to-image translation [15, 32, 40], video generation [34, 33, 9], and data augmentation for discriminative tasks such as object detection [24]. GANs [18, 3] transform a latent code to an image by learning the underlying distribution of training data. A more recent architecture, StyleGANv2 [20], has set the benchmark for generation of photorealistic human faces. However, training such networks requires significant amounts of data, significantly increasing the barrier to train SOTA GANs for specific use cases such as hairstyle transfer. Consequently, methods built using pretrained generators are becoming the de facto standard for executing various image manipulation tasks. In an embodiment, StyleGANv2 [20] is leveraged as an expressive pretrained face synthesis model, and an optimization approach for using pretrained generators for controlled attribute manipulation is outlined.

Latent Space Embedding. Understanding and manipulating the latent space of GANs via inversion has become an active field of research. GAN inversion involves embedding an image into the latent space of a GAN such that the synthesized image resulting from that latent embedding is the most accurate reconstruction of the original image. I2S [1] is a framework able to reconstruct an image by optimizing the extended latent space $\mathcal{W}^+$ of a pretrained StyleGAN [19]. Embeddings sampled from $\mathcal{W}^+$ are the concatenation of 18 different 512-dimensional w vectors, one for each layer of the StyleGAN architecture. I2S++ [2] further improved the image reconstruction quality by additionally optimizing the noise space $\mathcal{N}$. Furthermore, including semantic masks in the I2S++ framework allows users to perform tasks such as image inpainting and global editing. Recent methods [13, 27, 41] learn an encoder to map inputs from the image space directly to $\mathcal{W}^+$ latent space. In an embodiment, LOHO follows GAN inversion, in that the approach optimizes the more recent StyleGANv2's $\mathcal{W}^+$ space and noise space $\mathcal{N}$ to perform semantic editing of hair on portrait images. In an embodiment, LOHO further utilizes a GAN inversion algorithm for simultaneous manipulation of spatially local attributes, such as hair structure, from multiple sources while preventing interference between the attributes' different competing objectives.

Hairstyle Transfer. Hair is a challenging part of the human face to model and synthesize. Previous work on modeling hair includes capturing hair geometry [8, 7, 6, 35], and using this hair geometry downstream for interactive hair editing. However, these methods are unable to capture key visual factors, thereby compromising the result quality. Although recent work [16, 23, 21] showed progress on using GANs for hair generation, these methods do not allow for intuitive control over the synthesized hair. MichiGAN [30] proposed a conditional synthesis GAN that allows controlled manipulation of hair. MichiGAN disentangles hair into four attributes by designing deliberate mechanisms and representations and produces SOTA results for hair appearance change. Nonetheless, MichiGAN has difficulty handling hair transfer scenarios with arbitrary shape change.

This is because MichiGAN implements shape change using a separately trained inpainting network to fill "holes" created during the hair transfer process. In contrast, method aspects herein invoke the prior distribution of a pretrained GAN to "infill" in latent space rather than pixel space. As compared to MichiGAN, method aspects herein produce more realistic synthesized images in the challenging case where hair shape changes.

Methodology

Background

The objective function proposed in Image2StyleGAN++ (I2S++) [2] is observed as:

$$L = \lambda_s L_{style}(M_s, G(w, n), y) + \lambda_p L_{percept}(M_p, G(w, n), x) + \frac{\lambda_{mse1}}{N}\|M_m \odot G(w, n) - x\|_2^2 + \frac{\lambda_{mse2}}{N}\|(1 - M_m) \odot G(w, n) - y\|_2^2 \quad (1)$$

where w is an embedding in the extended latent space $\mathcal{W}^+$ of StyleGAN, n is a noise vector embedding, $M_s$, $M_m$, and $M_p$ are binary masks to specify image regions contributing to the respective losses, $\odot$ denotes the Hadamard product, G is the StyleGAN generator, x is the image to reconstruct in mask $M_m$, and y is the image to reconstruct outside $M_m$, i.e., in $(1-M_m)$.

Variations on the I2S++ objective function in Equation (1) are used by [2] to improve image reconstruction, image crossover, image inpainting, local style transfer, and other tasks. For hairstyle transfer it is desired to do both image crossover and image inpainting. Transferring one hairstyle to another person requires crossover, and the leftover region where the original person's hair used to be requires inpainting.

Framework

Figure 2:
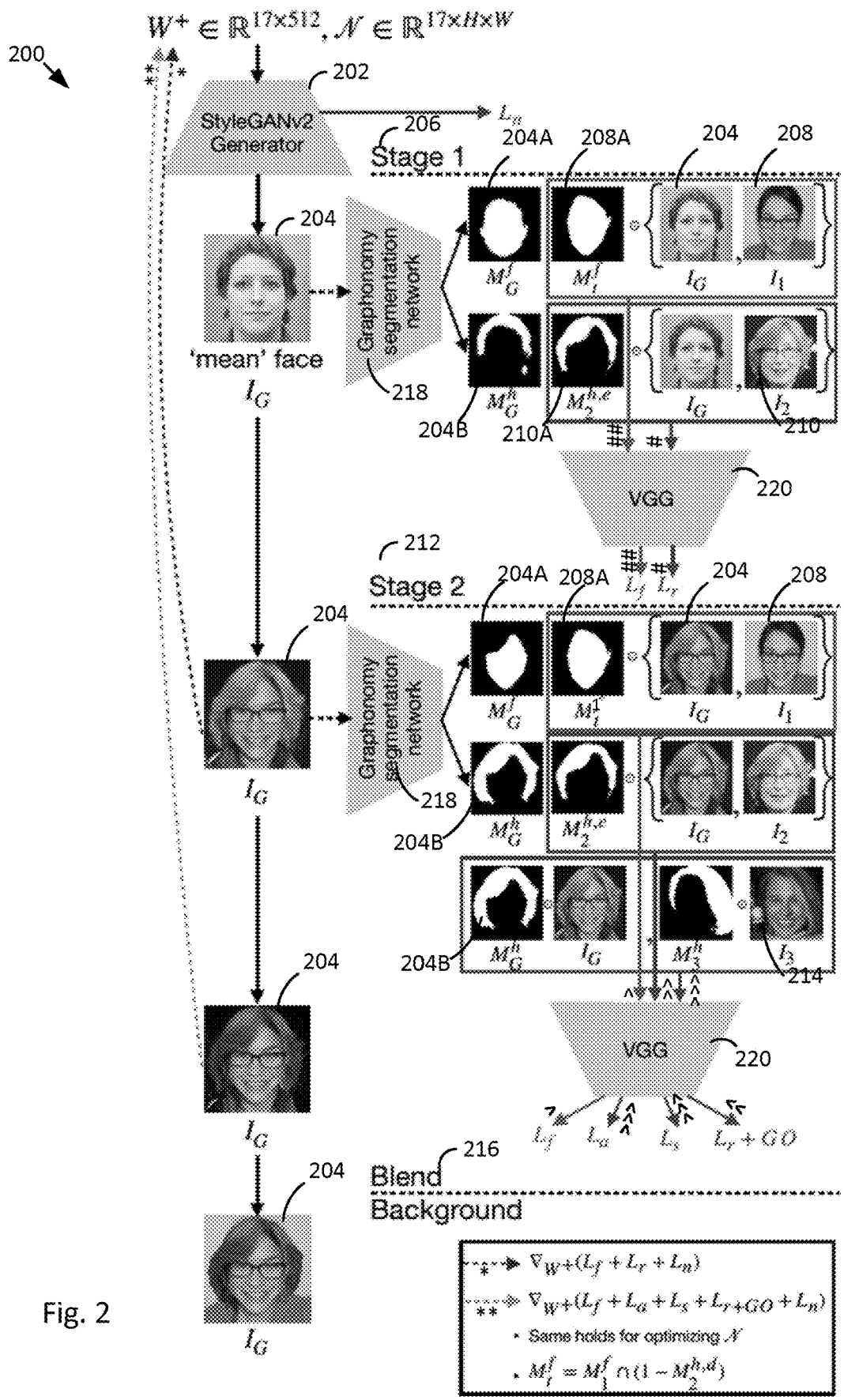
FIG. 2 is a framework of a two stage network structure with background blending in accordance with an embodiment.

FIG. 2 shows a two-stage network framework with background blending (inpainting) 200 for LOHO in accordance with an embodiment. Network framework 200 represents an inference time framework in contrast to a training framework. GAN generator 202 comprises a pretrained GAN for style transfer. Starting with the 'mean' face 204 ($I_G$), in Stage 1 (206), network framework 200 reconstructs a target identity (of $I_1$ (208)) and a target perceptual structure of hair (from $I_2$ (210)). In Stage 2 (212), framework 200 transfers a target hair finer style and appearance (from $I_3$ (214)), while maintaining the perceptual structure via Gradient Orthogonalization (GO). Finally, $I_G$ is blended with background.

For the hairstyle transfer problem, provided are three portrait images of people: $I_1$, $I_2$ and $I_3$. (208, 210 and 214). Consider transferring person 2's ($I_2$'s) attribute of hair shape and structure, and person 3's ($I_3$'s) attributes of hair appearance and finer style to person 1 ($I_1$). Let $M_1^f$ (208A) be $I_1$'s binary face mask, and $M_1^h$, $M_2^h$ and $M_3^h$ (not shown) be $I_1$'s, $I_2$'s, and $I_3$'s binary hair masks. Next, $M_2^h$ is separately dilated and eroded by roughly 20% to produce the dilated version, $M_2^{h,d}$, and the eroded version, $M_2^{h,e}$ (210A). Let $M_2^{h,ir} \equiv M_2^{h,d} - M_2^{h,e}$ be the ignore region (e.g. non-face, non-hair background) that requires inpainting. In the embodiment, $M_2^{h,ir}$ is not optimized; rather, StyleGANv2 (GAN Generator 202) is invoked to inpaint relevant details in this region. This feature allows the network framework 200 to perform hair shape transfer in situations where person 1 and person 2's hair shapes are misaligned.

In the two stages 206 and 212, a segmentation network 218 is used to process the synthesized image (respectively as input to stage 1 206 and after it is refined and provided as input to stage 2 212) and the input images ($I_1$, $I_2$ and $I_3$) to define respective segmentation masks. In the two stages 206 and 212, according to an embodiment, a pretrained CNN 220 (e.g. VGG [28]) for facial image processing is used to extract high-level features as further described.

In the embodiment 200, a background of $I_1$ is not optimized. Therefore, to recover the background, at 216, in the embodiment, $I_1$'s background is soft-blended with the synthesized image's ($I_G$) foreground (hair and face). Specifically, in the embodiment, GatedConv [36] (not shown) is used to inpaint the masked out foreground region of $I_1$, following which blending is performed.

Objective

To perform hairstyle transfer, losses are used to supervise relevant regions of the synthesized image. To keep notation simple, let $I_G \equiv G(\mathcal{W}^{++} + \mathcal{N})$ be the synthesized image, and $M_G^f$ (204A) and $M_G^h$ (204B) be its corresponding face and hair regions.

Identity Reconstruction. In order to reconstruct person 1's identity, in an embodiment, the Learned Perceptual Image Patch Similarity (LPIPS) [39] loss is used. LPIPS is a perceptual loss based on human similarity judgements and, therefore, is well suited for facial reconstruction. To compute the loss, a pretrained VGG [28] 220 is used to extract high-level features [17] for both $I_1$ and $I_G$. Features are extracted and summed, in an embodiment, from all 5 blocks of VGG 220 to form a face reconstruction objective:

$$L_f = \frac{1}{5} \sum_{b=1}^{5} LPIPS[VGG^b(I_1 \odot (M_1^f \cap (1 - M_2^{h,d}))), VGG^b(I_G \odot (M_1^f \cap (1 - M_2^{h,d})))] \tag{2}$$

where b denotes a VGG block, and $M_1^f \cap (1 - M_2^{h,d})$ represents the target mask, calculated as the overlap between $M_1^f$ and the foreground region of the dilated mask $M_2^{h,d}$. This formulation places a soft constraint on the target mask.

Hair Shape and Structure Reconstruction. To recover person 2's hair information, supervision is enforced via the LPIPS loss. However, naïvely using $M_2^h$ as the target hair mask can cause the generator 202 to synthesize hair on undesirable regions of $I_G$. This is especially true when the target face and hair regions do not align well. To fix this problem, the eroded mask, $M_2^{h,e}$, is used as it places a soft constraint on the target placement of synthesized hair. $M_2^{h,e}$, combined with $M_2^{h,ir}$, allow the generator to handle misaligned pairs by inpainting relevant information in non-overlapping regions. To compute the loss, features from blocks 4 and 5 of VGG 220 are extracted corresponding to hair regions of $I_2$, $I_G$ to form a hair perceptual structure objective:

$$L_r = \frac{1}{2} \sum_{b \in \{4,5\}} LPIPS[VGG^b(I_2 \odot M_2^{h,e}), VGG^b(I_G \odot M_2^{h,e})] \tag{3}$$

Hair Appearance Transfer. Hair appearance refers to the globally consistent colour of hair that is independent of hair shape and structure. As a result, it can be transferred from samples of different hair shapes. To transfer the target appearance, in an embodiment, 64 feature maps are extracted from the shallowest layer of VGG (relu1_1) as it best accounts for colour information. Then, average-pooling is performed within the hair region of each feature map to discard spatial information and capture global appearance. An estimate of the mean appearance A in $\mathbb{R}^{64 \times 1}$ is obtained as $$A(x, y) = \sum \frac{\phi(x) \odot y}{|y|},$$

where $\phi(x)$ represents the 64 VGG feature maps of image x, and y indicates the relevant hair mask. Finally, the squared $L_2$ distance is computed to give a hair appearance objective:

$$L_a = \|A(I_3, M_3^h) - A(I_G, M_G^h)\|_2^2 \tag{4}$$

Hair Finer Style Transfer. In addition to the overall colour, hair also contains finer details such as wisp styles, and shading variations between hair strands. Such details cannot be captured solely by the appearance loss that estimates the overall mean. Better approximations are thus required to compute the varying finer styles between hair strands. The Gram matrix [10] captures finer hair details by calculating the second-order associations between high-level feature maps. In an embodiment, the Gram matrix is computed after extracting features from layers: {relu1_2; relu2_2; relu3_3; relu4_4} of VGG $$\mathcal{G}^l(\gamma^l) = \gamma^{l^T} \gamma^l \tag{5}$$

where, $\gamma^l$ represents feature maps in $\mathbb{R}^{HW \times C}$ that are extracted from layer l, and $\mathcal{G}^l$ is the Gram matrix at layer l. Here, C represents the number of channels, and H and W are the height and width. Finally, the squared $L_2$ distance is computed as $$L_s = \frac{1}{4} \sum_{l=1}^{4} \|\mathcal{G}^l(VGG^l(I_3 \odot M_3^h)) - \mathcal{G}^l(VGG^l(I_G \odot M_G^h))\|_2^2 \tag{6}$$

Noise Map Regularization. Explicitly optimizing the noise maps $n \in \mathcal{N}$ can cause the optimization to inject actual signal into them. To prevent this, in an embodiment, regularization terms of noise maps [20] are introduced. For each noise map greater than 8×8, in an embodiment, a pyramid down network is used to reduce the resolution to 8×8. The pyramid network averages 2×2 pixel neighbourhoods at each step. Additionally, in an embodiment, the noise maps are normalized to be zero mean and unit variance, producing a noise objective:

$$L_n = \sum_{i,j} \left[ \frac{1}{r_{i,j}^2} \cdot \sum_{x,y} n_{i,j}(x, y) \cdot n_{i,j}(x-1, y) \right]^2 + \sum_{i,j} \left[ \frac{1}{r_{i,j}^2} \cdot \sum_{x,y} n_{i,j}(x, y) \cdot n_{i,j}(x, y-1) \right]^2 \quad (7)$$

where $n_{i,0}$ represents the original noise map and $n_{i,j>0}$ represents the downsampled versions. Similarly, $r_{i,j}$ represents the resolution of the original or downsampled noise map.

Combining all the losses, the overall optimization objective is $$L = \underset{(\mathcal{W}^+, \mathcal{N})}{\mathrm{argmin}} \, [\lambda_f L_f + \lambda_r L_r + \lambda_a L_a + \lambda_s L_s + \lambda_n L_n] \quad (8)$$

Optimization Strategy

Two-Stage Optimization. Given the similar nature of the losses $L_r$, $L_a$, and $L_s$, it is posited that jointly optimizing all losses from the start will cause person 2's hair information to compete with person 3's hair information, leading to undesirable synthesis. To mitigate this issue, the overall objective is optimized in two stages. In stage 1, only the target identity and hair perceptual structure is reconstructed, i.e., set $\lambda_a$ and $\lambda_s$ in Equation 8 to zero. In stage 2, all the losses except $L_r$ are optimized; stage 1 will provide a better initialization for stage 2, thereby leading the model to convergence.

However, this technique in itself has a drawback. There is no supervision to maintain the reconstructed hair perceptual structure after stage 1. This lack of supervision allows StyleGANv2 to invoke its prior distribution to inpaint or remove hair pixels, thereby undoing the perceptual structure initialization found in stage 1. Hence, it is necessary to include $L_r$ in stage 2 of optimization.

Gradient Orthogonalization. $L_r$, by design, captures all hair attributes of person 2: perceptual structure, appearance, and finer style. As a result, $L_r$'s gradient competes with the gradients corresponding to the appearance and finer style of person 3. This issues is addressed by manipulating $L_r$'s gradient such that its appearance and finer style information are removed. More specifically, $L_r$'s perceptual structure gradients are projected onto the vector subspace orthogonal to its appearance and finer style gradients. This allows person 3's hair appearance and finer style to be transferred while preserving person 2's hair structure and shape.

Assuming optimization of the $\mathcal{W}^+$ latent space, the gradients computed are $$g_{R_2} = \nabla_{\mathcal{W}^+} L_r, g_{A_2} = \nabla_{\mathcal{W}^+} L_a, g_{S_2} = \nabla_{\mathcal{W}^+} L_s, \quad (9)$$

where, $L_r$, $L_a$, and $L_s$ are the LPIPS, appearance, and finer style losses computed between $I_2$ and $I_G$. To enforce orthogonality, $g_{R_2}^T(g_{A_2}+g_{S_2})$ is sought to be minimized. This is achieved by projecting away the component of $g_{R_2}$ parallel to $(g_{A_2}+g_{S_2})$, using the structure-appearance gradient orthogonalization $$g_{R_2} = g_{R_2} - \frac{g_{R_2}^T(g_{A_2}+g_{S_2})}{\|g_{A_2}+g_{S_2}\|_2^2}(g_{A_2}+g_{S_2}) \quad (10)$$

after every iteration in stage 2 of optimization.

Experiments and Results

Implementation Details

Datasets. In an embodiment, the Flickr-Faces-HQ dataset (FFHQ) [19] that contains 70 000 high-quality images of human faces was used. Flickr-Faces-HQ has significant variation in terms of ethnicity, age, and hair style patterns. In an embodiment, tuples of images ($I_1$, $I_2$, $I_3$) were selected based on the following constraints: (a) each image in the tuple should have at least 18% of pixels contain hair, and (b) $I_1$ and $I_2$'s face regions must align to a certain degree. To enforce these constraints, in an embodiment, hair and face masks were extracted using the Graphonomy segmentation network [11] and 68 2D facial landmarks using 2D-FAN [4] were estimated. For every $I_1$ and $I_2$, intersection over union (IoU) and pose distance (PD) were computed using the corresponding face masks, and facial landmarks. Finally, in an embodiment, selected tuples were distributed into three categories, easy, medium, and difficult, such that the following IoU and PD constraints are both met as in Table 1.

TABLE 1

Criteria used to define the alignment of head pose between sample tuples

| Category | Easy | Medium | Difficult |
|---|---|---|---|
| IoU range | (0:8; 1:0] | (0:7; 0:8] | (0:6; 0:7] |
| PD range | [0:0; 2:0) | [2:0; 4:0) | [4:0; 5:0) |

Training Parameters. In an embodiment, the Adam optimizer [22] was used with an initial learning rate of 0.1 and annealed it using a cosine schedule [20]. In an embodiment, the optimization occurs in two stages, where each stage consists of 1000 iterations. Based on ablation studies, in an embodiment, selected were an appearance loss weight $\lambda_a$ of 40, finer style loss weight $\lambda_s$ of $1.5 \times 10^4$, and noise regularization weight $\lambda_n$ of $1 \times 10^5$. And the remaining loss weights were set to 1.

Effect of Two-Stage Optimization

Figure 3:
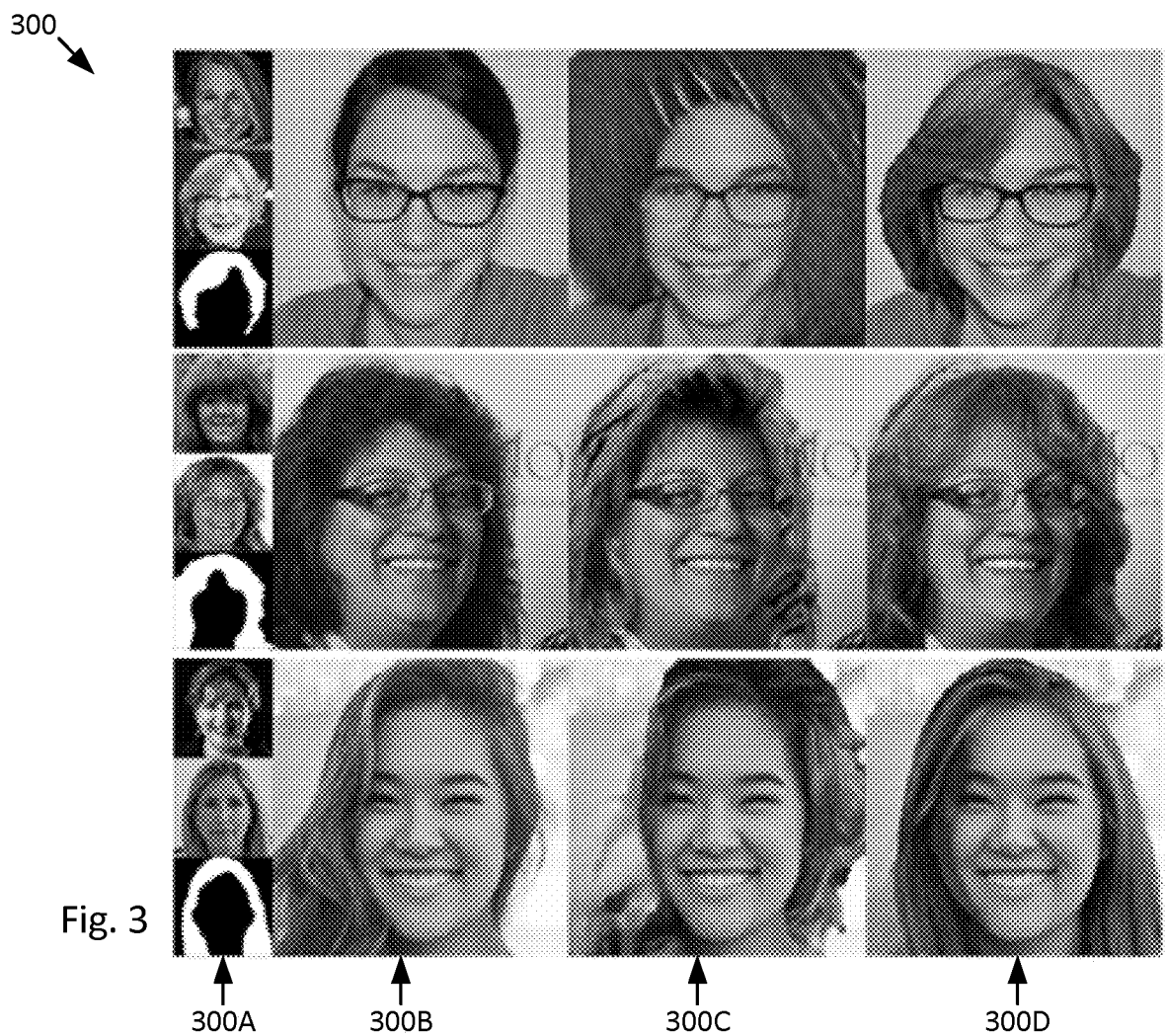
FIG. 3 is image array showing the effect of two-stage optimization in accordance with an embodiment.

FIG. 3 is an image array 300 in four columns showing the effect of two-stage optimization in accordance with an embodiment. In image array 300, Col. 1 (300A) shows reference images; Col. 2 (300B) shows identity (e.g. person 1); Col. 3 (300C) shows synthesized images when losses are optimized jointly; and Col. 4 (300D) shows synthesized images via two-stage optimization+gradient orthogonalization.

Optimizing all losses jointly in an objective function causes the framework to diverge. While the identity is reconstructed, the hair transfer fails (Col. 3, 300C of FIG. 3). The structure and shape of the synthesized hair is not preserved, causing undesirable results. On the other hand, performing optimization in two stages clearly improves the synthesis process leading to generation of photorealistic images that are consistent with the provided references. Not only is the identity reconstructed, the hair attributes are transferred as per desired requirements.

Effect of Gradient Orthogonalization

Figure 4:
FIG. 4 is an array showing an effect of Gradient Orthogonalization (GO) in accordance with an embodiment.
Figure 5A:
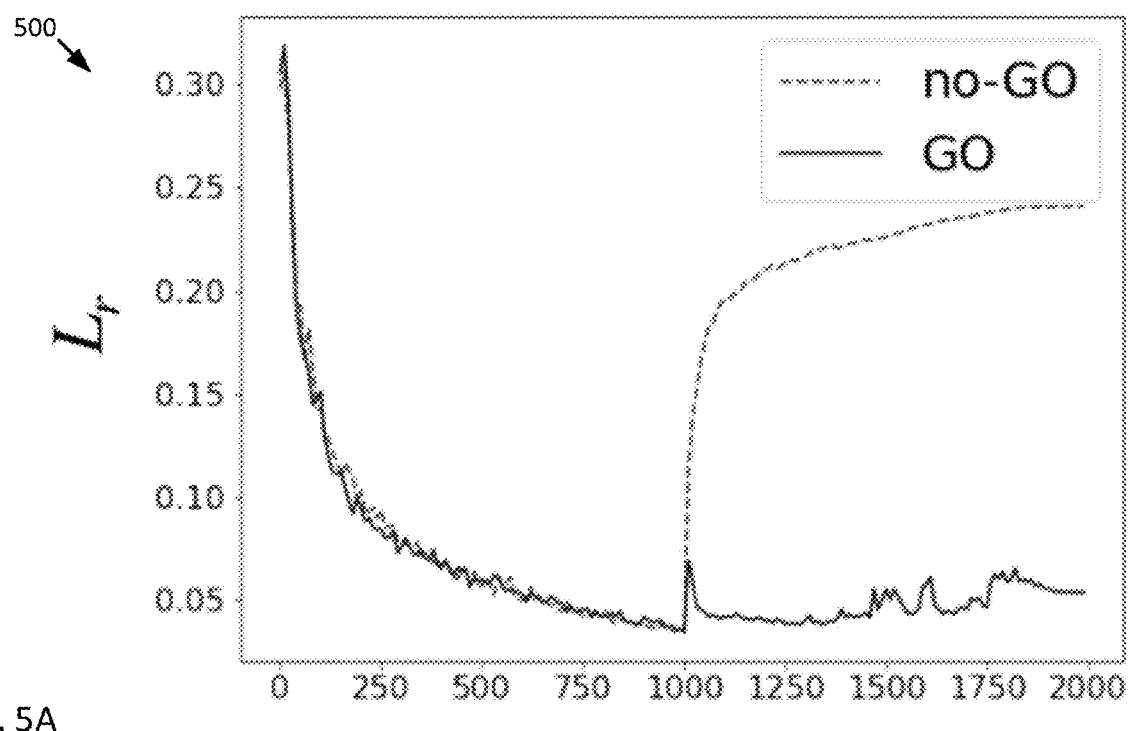
FIGS. 5A and 5B are graphs showing an effect of GO in accordance with an embodiment.
Figure 5B:
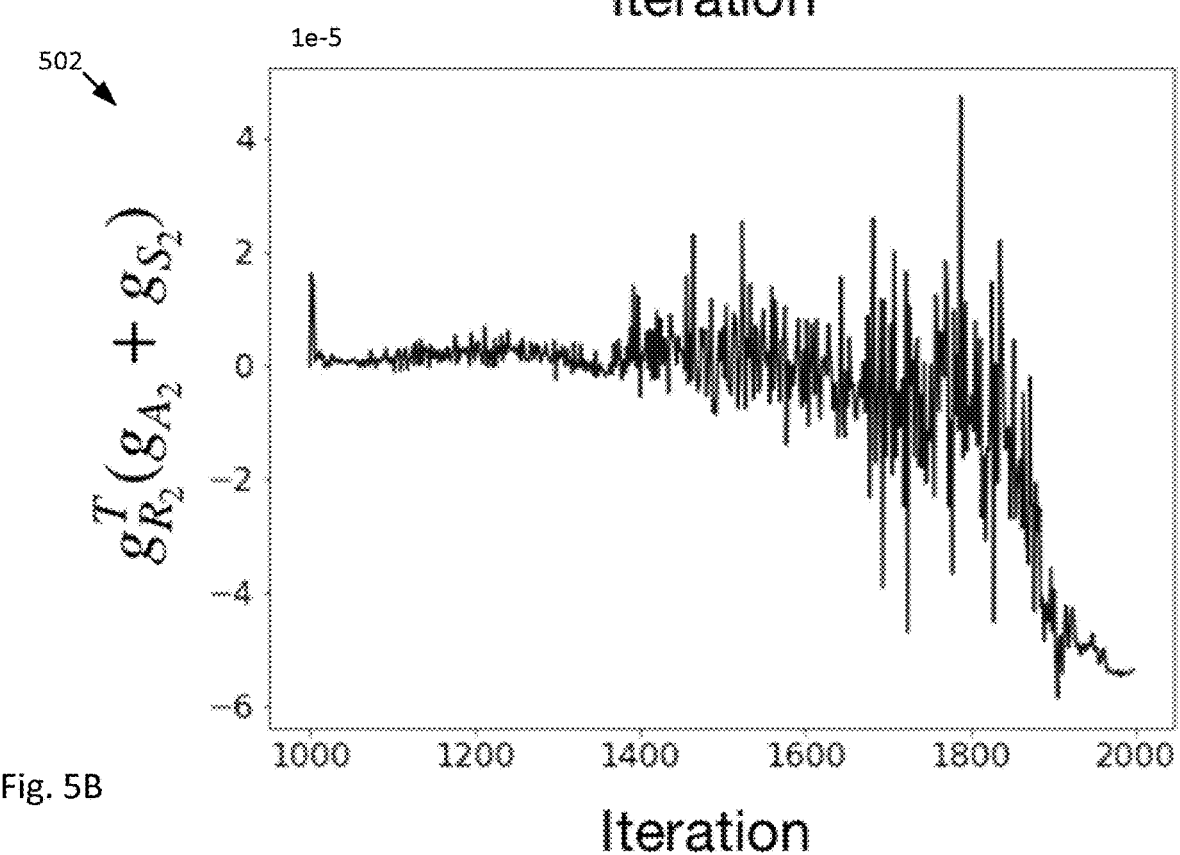

FIG. 4 is an image array 400 showing an effect of Gradient Orthogonalization (GO) in accordance with an embodiment. Row 1 (400A) shows four reference images (from left to right): Identity; target hair appearance and finer style; target hair structure; and shape (mask). Row 2 (400B) shows two image pairs e.g. i) (a) and (b); and ii) (c) and (d) comprising respective synthesized images and their corresponding hair masks for no-GO and GO methods, respectively. FIGS. 5A and 5B are graphs 500 and 502 showing an effect of GO in accordance with an embodiment. Graphs 500 and 502 show, respectively, LPIPS hair reconstruction loss (GO vs no-GO) vs iterations and trend of $g_{R_2}^T(g_{A_2}+g_{S_2})(1e-5)$ in stage 2 of optimization.

Two variations (embodiments) of the framework are compared: no-GO and GO. GO involves manipulating $L_r$'s gradients via gradient orthogonalization, whereas no-GO keeps $L_r$ untouched. No-GO is unable to retain the target hair shape, causing $L_r$ to increase in stage 2 of optimization i.e., after iteration 1000 (FIGS. 4 & 5A-5B). The appearance and finer style losses, being position invariant, do not contribute to the shape. GO, on the other hand, uses the reconstruction loss in stage 2 and retains the target hair shape. As a result, the IoU computed between $M_2^h$ and $M_G^h$ increases from 0:857 (for no-GO) to 0:932 (GO).

In terms of gradient disentanglement, the similarity between $g_{R_2}$ and $(g_{A_2}+g_{S_2})$ decreases with time, indicating that the embodiment of the framework with GO is able to disentangle person 2's hair shape from its appearance and finer style (FIGS. 5A-5B). This disentanglement allows a seamless transfer of person 3's hair appearance and finer style to the synthesized image without causing model divergence. Here on, the GO version of the framework is used for comparisons and analysis.

Comparison with SOTA

Hair Style Transfer. The GO version of the framework was compared with the SOTA model MichiGAN. MichiGAN contains separate modules to estimate: (1) hair appearance, (2) hair shape and structure, and (3) background. The appearance module bootstraps the generator with its output feature map, replacing the randomly sampled latent code in traditional GANs [12]. The shape and structure module outputs hair masks and orientation masks, denormalizing each SPADE ResBlk [25] in the backbone generation network. Finally, the background module progressively blends the generator outputs with background information. In terms of training, MichiGAN follows the pseudo-supervised regime. Specifically, the features (that are estimated by the modules) from the same image are fed into MichiGAN to reconstruct the original image. At test time, FID is calculated for 5000 images at 512 px resolution uniform randomly sampled from FFHQ's test split.

To ensure that results are comparable, the above procedure was followed and FID scores [14] computed for LOHO. In addition to computing FID on the entire image, in an embodiment, the score was calculated solely relying on the synthesized hair and facial regions with the background masked out. Achieving a low FID score on masked images would mean that the LOHO model is indeed capable of synthesizing realistic hair and face regions. This embodiment is called LOHO-HF. As MichiGAN's background inpainter module is not publicly available, GatedConv [36] is used in an embodiment to inpaint relevant features in the masked out hair regions.

Quantitatively, LOHO outperforms MichiGAN and achieves an FID score of 8.419, while MichiGAN achieves 10.697 (Table 2). This improvement indicates that the LOHO optimization framework is able to synthesize high quality images. LOHO-HF achieves an even lower score of 4:847, attesting to the superior quality of the synthesized hair and face regions. 5000 images uniform-randomly sampled from the testing set of FFHQ were used. Note that the symbol "↓" indicates that a lower value represents a better result.

TABLE 2

Fréchet Inception Distance (FID) for different methods

| Method | MichiGAN | LOHO-HF | LOHO |
|---|---|---|---|
| FID (↓) | 10.697 | 4.847 | 8.419 |

Figure 6:
FIG. 6 is an image array showing a qualitative comparison of MichiGAN and LOHO in accordance with an embodiment.

FIG. 6 is an image array 600 showing a qualitative comparison of MichiGAN and LOHO in accordance with an embodiment. In each of the 6 rows showing 6 respective examples, Col. 1 (narrow) (600A) shows reference images; Col. 2 (600B) shows identity person; Col. 3 (600C) shows MichiGAN output; and Col. 4 shows LOHO output (zoomed in for better visual comparison). In Rows 1-2, examples show MichiGAN "copy-pastes" the target hair attributes while LOHO blends the attributes, thereby synthesizing more realistic images. In Rows 3-4, examples show LOHO handles misaligned examples better than MichiGAN. In Rows 5-6, examples show LOHO transfers the right style information.

Qualitatively, the method in accordance with LOHO is able to synthesize better results for challenging examples. LOHO naturally blends the target hair attributes with the target face as illustrated in the image array 600. MichiGAN naively copies the target hair on the target face, causing lighting inconsistencies between the two regions. LOHO handles pairs with varying degrees of misalignment whereas MichiGAN is unable to do so due to its reliance on blending background and foreground information in pixel space rather than latent space. Lastly, LOHO transfers relevant style information, on par with MichiGAN. In fact, due to an addition of the style objective to optimize second order statistics by matching Gram matrices, LOHO synthesizes hair with varying colour even when the hair shape source person has uniform hair colour, as in the bottom two rows (Rows 5-6) FIG. 6.

Identity Reconstruction Quality. LOHO was also compared with two recent image embedding methods: I2S [1] and I2S++ [2]. I2S introduces the framework that is able to reconstruct images of high quality by optimizing the $\mathcal{W}^+$ latent space. I2S also shows how the latent distance, calculated between the optimized style latent code $w^+$ and $\hat{w}$ of the average face, is related to the quality of synthesized images. I2S++, additionally to I2S, optimizes the noise space $\mathcal{N}$ in order to reconstruct images with high PSNR and SSIM values. Therefore, to assess LOHO's ability to reconstruct the target identity with high quality, similar metrics are computed on the facial region of synthesized images. Since inpainting in latent space is an integral part of LOHO results are compared with I2S++'s performance on image inpainting at 512 px resolution.

The model (LOHO), despite performing the difficult task of hair style transfer, is able to achieve comparable results (Table 3). I2S shows that the acceptable latent distance for a valid human face is in [30:6; 40:5] and LOHO lies within that range. Additionally, PSNR and SSIM scores for LOHO are better than I2S++, proving that LOHO reconstructs identities that satisfy local structure information.

TABLE 3

| | PSNR, SSIM and range of acceptable latent distances $\|w^* - \hat{w}\|$ for different methods | | |
|---|---|---|---|
| Method | I2S | I2S++ | LOHO |
| PSNR (dB) (↑) | — | 22.48 | 32.2 ± 2.8 |
| SSIM (↑) | — | 0.91 | 0.93 ± 0.02 |
| $\|w^* - \hat{w}\|$ | [30.6, 40.5] | — | 37.9 ± 3.0 |

Editing Attributes

Figure 7:
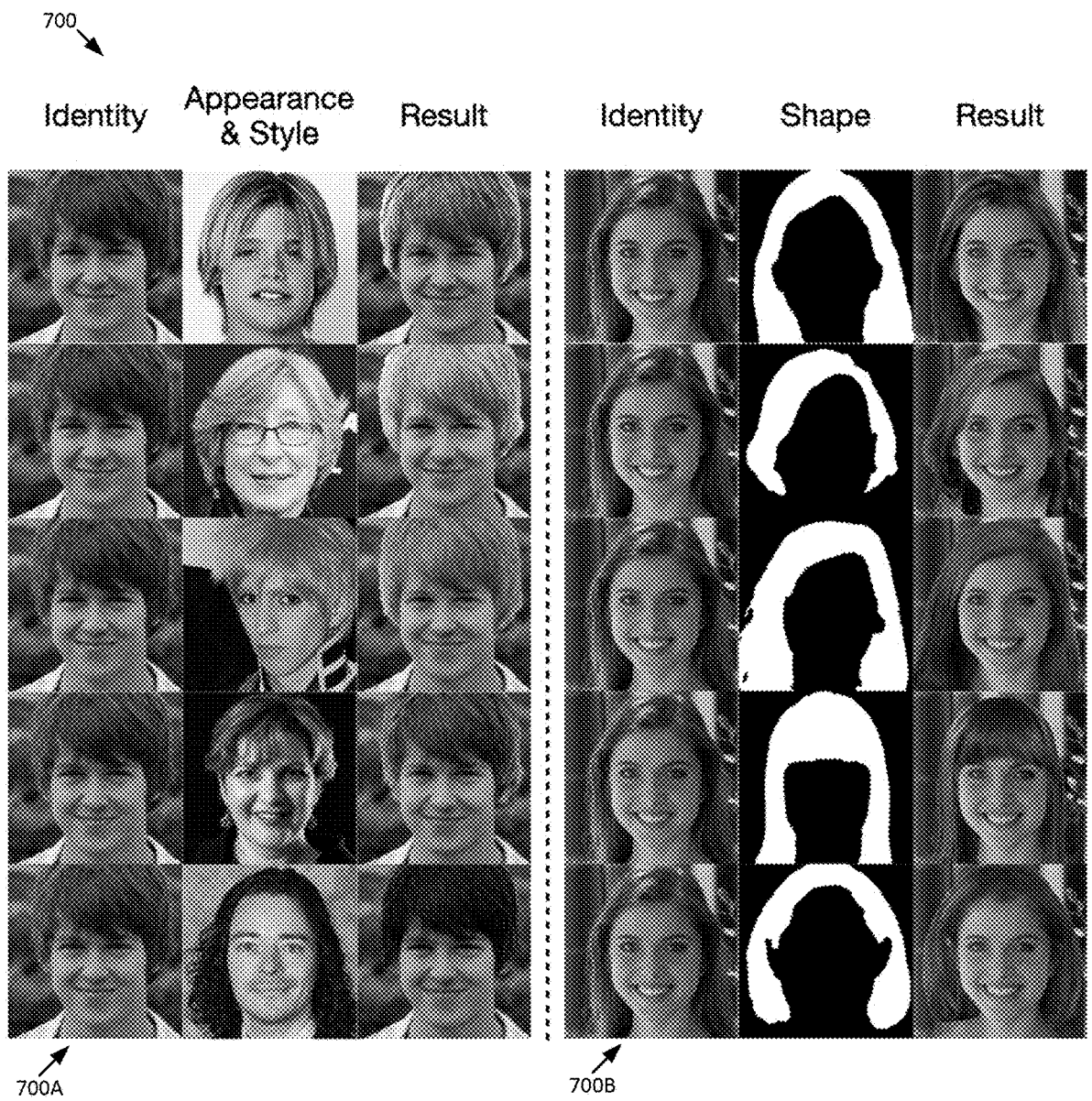
FIG. 7 shows an image array of examples representing individual attribute editing in accordance with an embodiment.
Figure 8:
FIG. 8 shows an image array of examples representing multiple attribute editing in accordance with an embodiment.

The LOHO framework and associated method, in accordance with embodiments, is capable of editing attributes of in-the-wild portrait images. In this setting, an image is selected and then an attribute is edited individually by providing reference images. For example, the hair structure and shape can be changed while keeping the hair appearance and background unedited. The LOHO framework and associated method, in accordance with embodiments, computes the non-overlapping hair regions and infills the space with relevant background details. Following the optimization process, the synthesized image is blended with the inpainted background image. The same holds for changing the hair appearance and finer style. LOHO disentangles hair attributes and allows editing them individually and jointly, thereby leading to desirable results. Thus, FIG. 7 shows an image array 700 of examples representing individual attribute editing and FIG. 8 shows an image array 800 of examples representing multiple attribute editing. Image array 700 comprises appearance and finer style examples in a first sub-array 700A (left side examples) and shape examples in a second sub-array 700B (right side examples). The results show in FIG. 7 that the model is able to edit individual hair attributes without them interfering with each other. In FIG. 8, the image array 800 represents results that show that the LOHO framework and associated method, in accordance with embodiments, is able to edit hair attributes jointly without the interference of each other.

Limitations

Figure 9A:
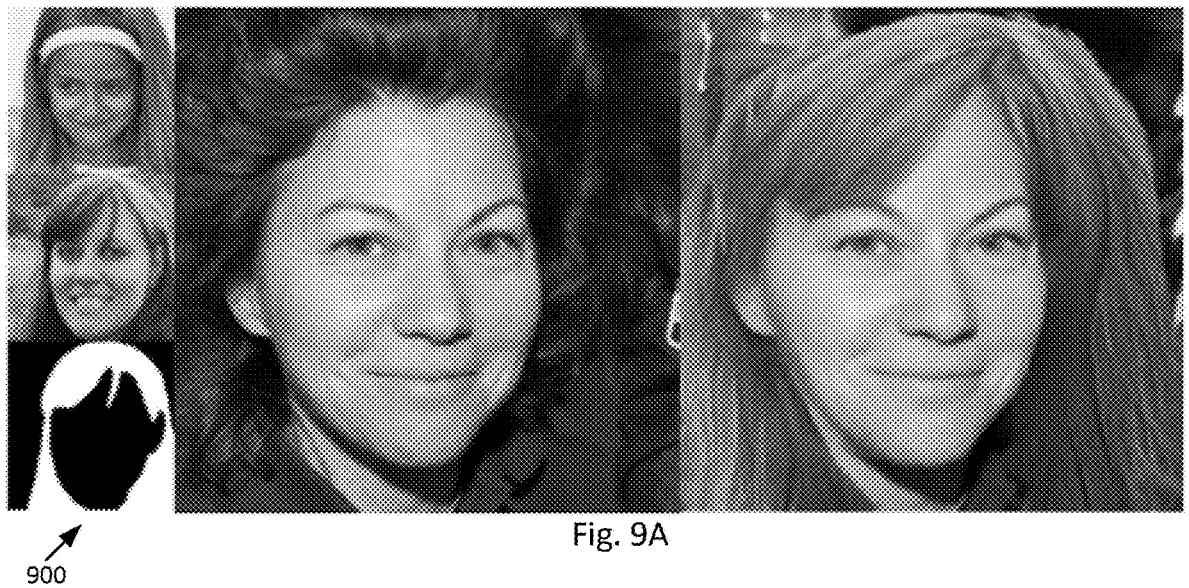
FIGS. 9A and 9B are images arrays showing examples of misalignment in accordance with an embodiment.
Figure 9B:

FIGS. 9A and 9B are images arrays 900 and 902 showing examples of misalignment in accordance with an embodiment. The LOHO framework and associated method, in accordance with embodiments, can be susceptible to extreme cases of misalignment (FIG. 9). In the study, such cases are categorized as difficult. They can cause the framework and associated method to synthesize unnatural hair shape and structure. GAN based alignment networks [38, 5] may be used to transfer pose, or alignment of hair across difficult samples.

Figure 10A:
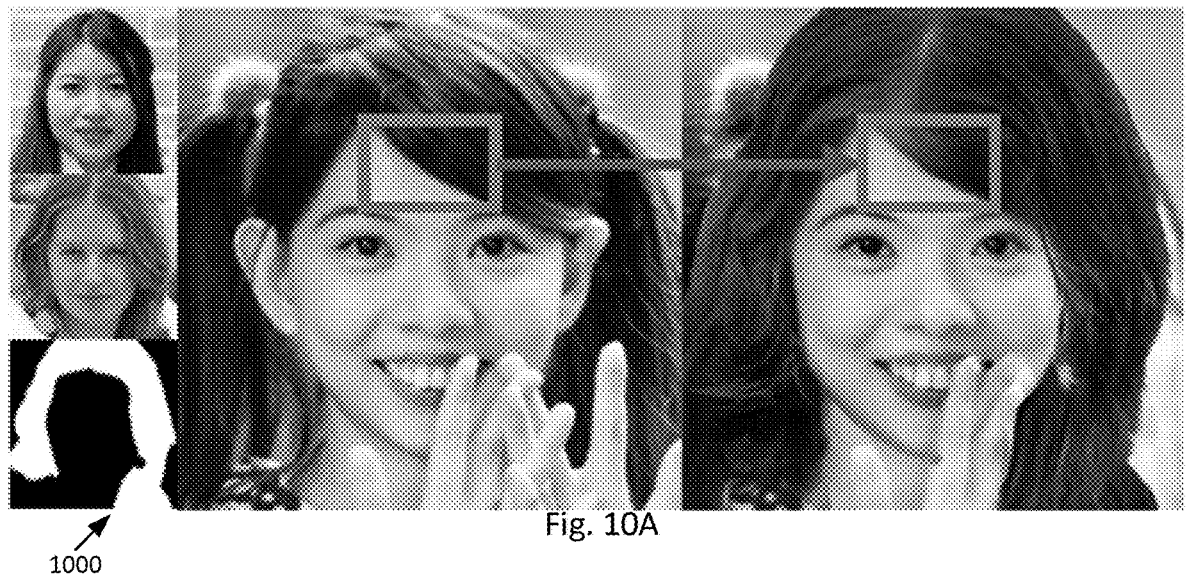
FIGS. 10A and 10B are images arrays showing examples of hair detail carry over in accordance with an embodiment.
Figure 10B:
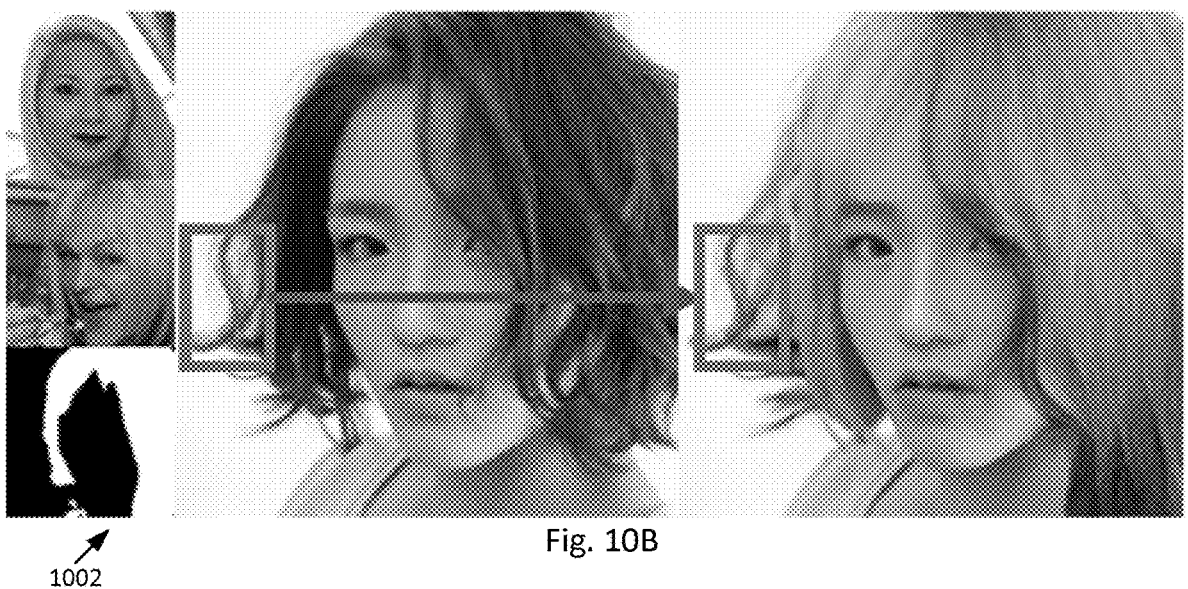

FIGS. 10A and 10B are images arrays 1000 and 1002 showing examples of hair detail carry over in accordance with an embodiment. This can be due to Graphonomy [11]'s imperfect segmentation of hair. More sophisticated segmentation networks [37, 31] can be used to mitigate this issue.

Real-World Applications

Figure 11:
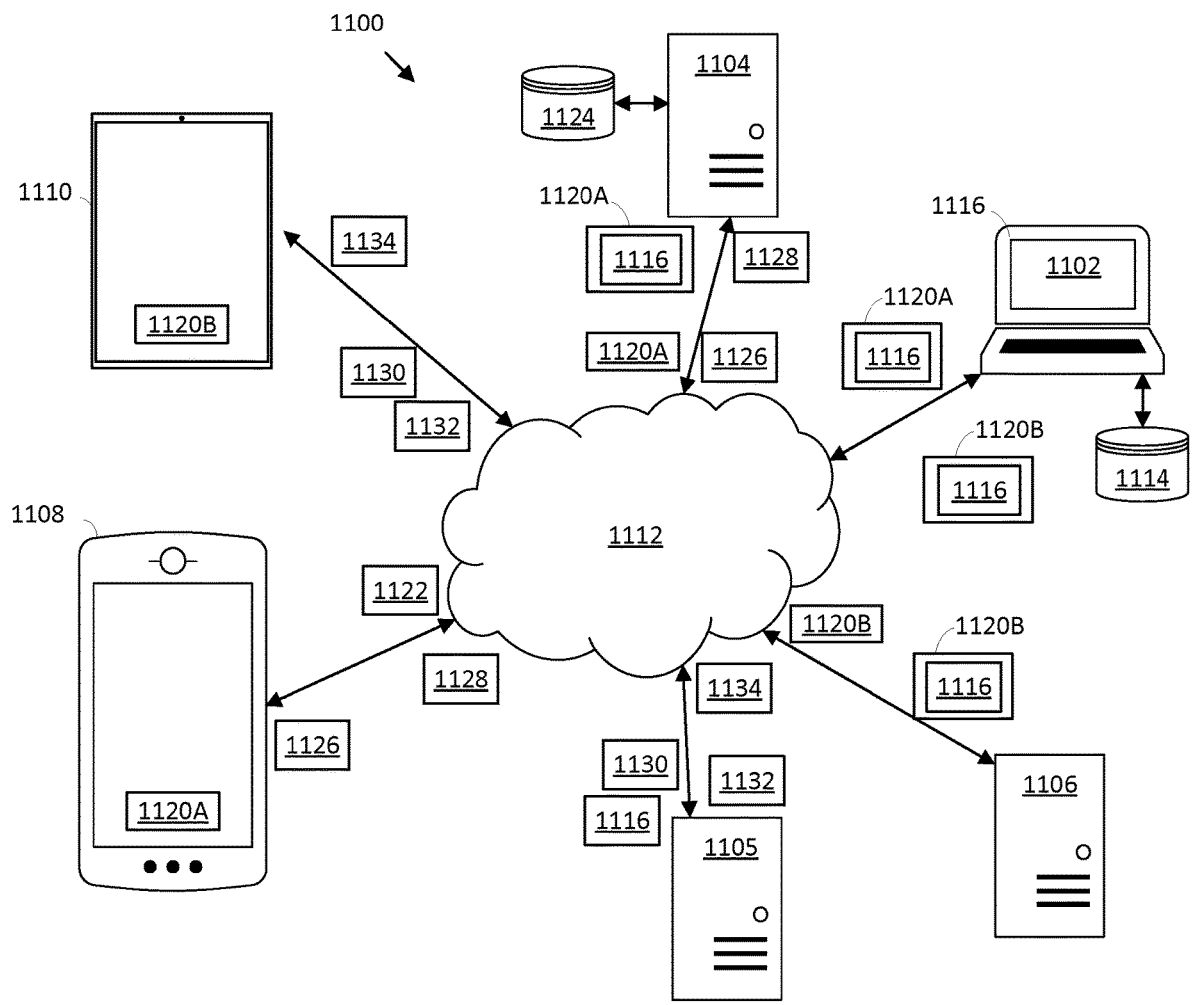
FIG. 11 is an illustration of a computer network, in accordance with an embodiment.

FIG. 11 is a drawing of a computer network 1100 showing a development computing device 1102, a website computing device 1104, cloud computing device 1105, an application distribution computing device 1106 and respective edge computing devices, namely a smartphone 1108 and a tablet 1110, in accordance with an embodiment. The computing devices are coupled via communications network 1112. The computer network 1100 is simplified. For example, website computing device 1104, cloud computing device 1105, and application distribution computing device 1106 are example devices of respective website, cloud, and application distribution systems. Communications network 1112 may comprise a plurality of wired and/or wireless networks, which may include private and public networks.

In the embodiment, development computing device 1102 is coupled to a datastore 1114 (which may include a database) storing one or more datasets such as for configuring (which may include training) and testing, etc. a network framework 1116. In accordance with an embodiment, network framework 116 comprises a GAN generator and is configured for two stage optimization to perform style transfer, particularly hairstyle transfer.

Datastore 1114 may store software, other components, tools, etc. to assist with development and implementation. In another embodiment, not shown, the datasets are stored on storage device of the development computing device 1102.

Development computing device 1102 is configured to define the network framework 1116 in accordance with an embodiment as described herein. For example, development computing device 1102 is configured to configure the network framework of FIG. 2. In an embodiment, development computing device 1102 is configured to incorporate a pretrained GAN configured for style transfer such as StyleGANv2 or a variant thereof as shown in FIG. 2.

In an embodiment, development computing device 1102 defines the network framework 1116 to execute on a server computer device such as website computing device 1104 or one accessible via website computing device 1104.

In an embodiment, development computing device 1102 defines the network framework 1116 to execute on cloud computing device 1105. Development computing device 1102 (or another, not shown) incorporates an interface to the network framework into an application 1120A, such as for a website and/or an application 1120B for the application distribution computing device (e.g. 1106) for distribution to respective edge devices such as smartphone 1108 and a tablet 1110.

The present embodiment of FIG. 11 does not show storing and executing a network framework per se on edge devices, such as a tablet, smartphone, etc. as an optimization process within such a framework executes requires significant processing resources. Execution on an edge device having typical resources for such devices would take a (relatively) long time (on the order of 10-20 minutes) for a single style transfer. Running the framework on a home PC, game console, or other generally consumer home oriented device would also be possible with a similar runtime. But, since the runtime is not sufficient at present to be perceived as interactive (yet), FIG. 11 shows a more practical use case where the network framework 1116 is provided by a remote server (e.g. website or cloud device). In this paradigm, identity and style attribute images are submitted to the server and a user awaits a response (e.g. synthesized image incorporating the identity and transferred style).

In an embodiment, application distribution computing device 1106 provides application store services (an example of e-commerce services) to distribute applications for execution on target devices running supported operating systems (OS). An example application distribution service provide by computing devices is Apple's App Store™ for iPhone™ or iPAD™ devices running iOS™ or iPADOS™ (trademarks of Apple Inc. Cupertino, CA). Another example service via applicable computing devices is Google Play™ (trademark of Google LLC, Mountain View, CA) for smartphones and tablet devices from various sources that run Android™ OS (trademark of Google LLC, Mountain View, CA). In the embodiment, smartphone 1108 receives application 1120A from website computing device 1104 and tablet 1110 receives application 1120B from application distribution computing device 1106.

In the present paradigm of both the website and application distribution examples, the network framework 1116 is not communicated to the edge devices. The edge devices are given access (via respective application interfaces) to the network framework 1116 which is executed on behalf of the edge devices. For example, a website computing device executes the network framework 1116 for application 1120A and a cloud computing device executes for application 1120B. The applications 1120A and 1120B, in respective embodiments, are configured for hairstyle try on (effects simulation applications), providing a virtual and/or augmented reality experience. Operations are described further herein below.

Figure 12:
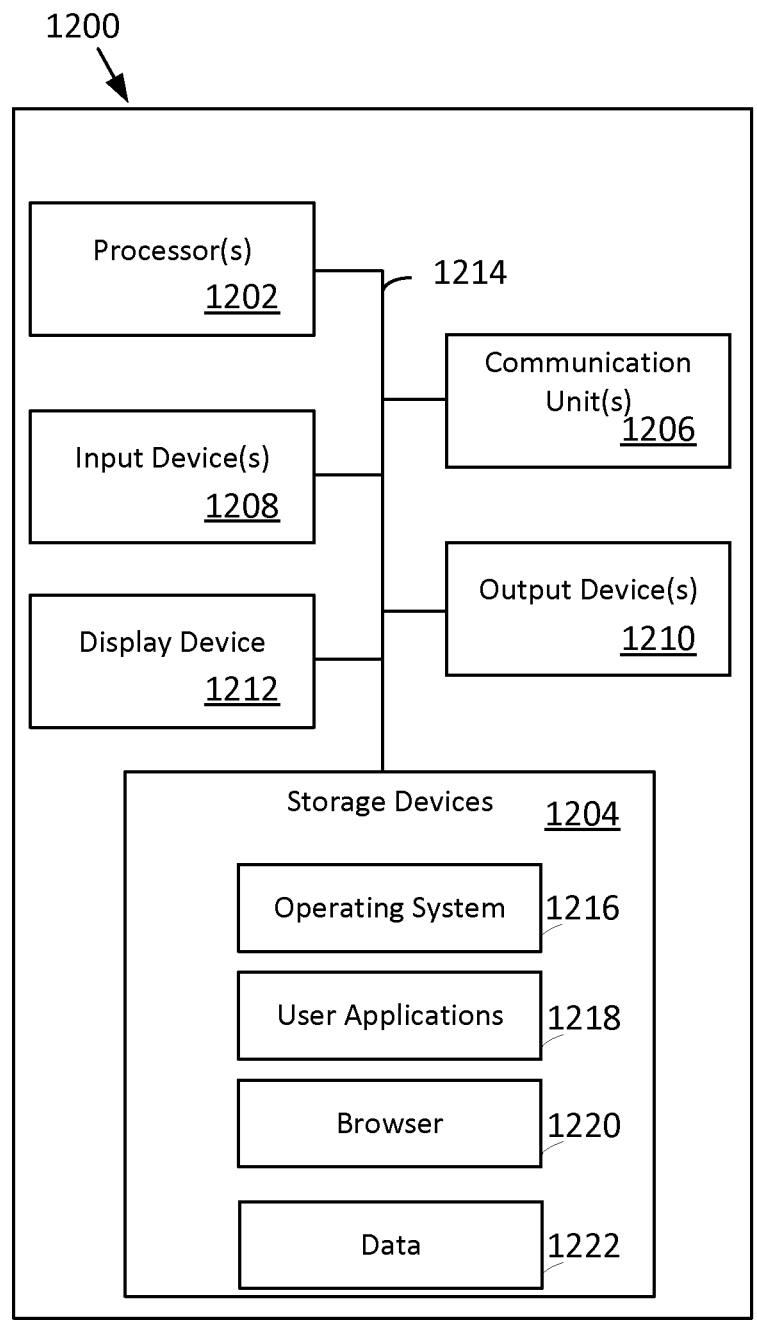
FIG. 12 is a block diagram of a representative computing device, in accordance with an embodiment.

FIG. 12 is a block diagram of a representative computing device 1200. The computing devices of FIG. 11 are configured similarly and in accordance with their respective needs and functions. Computing device 1200 comprise a processing unit 1202 (e.g. one or more processors, for example, a CPU, and/or GPU, or other processor, etc., which in an embodiment comprises at least one processor), a storage device 1204 (which in an embodiment is at least one storage device and can comprise memory) coupled thereto storing computer-readable instructions (and data), which instructions that, when executed by the processing unit (e.g. a processor), cause operations of the computing device, for example to execute a method. A storage device 804 can include any of a memory device (e.g. RAM, ROM, EEPROM, etc.), a solid state drive (e.g. comprising semiconductor storage devices/ICs which can define a flash memory), a hard disk drive or other type of drive, and storage media such as tape, discs (e.g. CD-ROM, etc.) Additional components include: communications units 1206 for coupling the device via wired or wireless means to a communications network an input device 1208; an output device 1210, which may comprise a display device 1212. In some examples the display device is a touch screen device providing an input/output device. Components of computing device 1200 are coupled via an internal communications system 1214, which may have external ports for coupling to additional devices.

In some examples, an output device comprises a speaker, a bell, a light, an audio output jack, fingerprint reader, etc. In some examples, the input device comprises a keyboard, a button, a microphone, a camera, a mouse or pointing device, etc. Other devices (not shown) may comprise a location determining device (e.g. GPS).

Storage device, in an example, stores an operating system 1216, user applications 1218 (of which application 1120A or 1120B may be one), a browser 1220 (a type of user application) for browsing websites and running executables such as application 1120A to access GAN generator 1116 received from a website; and data 822, for example, images and/or video frames from a camera or otherwise received.

In FIG. 11, communicated (data) items (as will become apparent) are shown adjacent respective communication connections between computing devices and the communication network. An item positioned adjacent a particular computing device is received by that device and an item positioned closer to the communication network is communicated from the respective computing device to another device as described herein below.

With continued reference to FIG. 11, in an example, a user of smartphone 1108 uses a browser and visits a website offered by website computing device 1104. Smartphone 1108 receives application 1120A (e.g. webpage and associated code and/or data) providing access to the network framework 1116. In the example, the application is an effects simulation application such as a hairstyle try on application providing a virtual and/or augmented reality experience. The user uses a camera and obtains a still or video image (e.g. a selfie), which source image is communicated by the application for processing by the network framework 1116 as image $I_1$ 1122. (If provided as video, a single image (e.g. a still image) may be extracted therefrom).

Via an interface (or respective interfaces) such as via a graphical user interface facilitated by application 1120A, the user chooses reference images (e.g. images $I_2$ and $I_3$) from a store 1124 of references images representing i) hair shape and structure (image $I_2$), ii) hair appearance (image $I_3$) and (iii) hair finer style (image $I_3$) to try on. Each of i), ii) and iii) comprise a respective hairstyle attribute.

The hairstyle try-on effects (features of the attributes) are generated and/or transferred to a resulting image ($I_G$) 1226 using the network framework 1116 while preserving the identity represented in image $I_1$ 1122. The resulting image 1226 ($I_G$) is communicated back to smartphone 1108 and displayed via its display device. In an embodiment, $I_G$ is displayed in a graphical user interface for comparison with $I_1$. In an embodiment, $I_G$ is displayed in a graphical user interface for comparison with all of $I_1$, $I_2$ and $I_3$.

In an embodiment, resulting image 1226 is stored to a storage device. In an embodiment, resulting image 1226 is shared (communicated) via any of social media, text message, email, etc.

In an embodiment, website computing device 1104 is enabled for services (e.g. e-commerce services) and facilitates purchases of hair or hairstyle products such as one or more products associated with the reference images tried on virtually via application 1120A. In an embodiment, website computing device 1104 provides a recommendation service to recommend hair or hairstyle products. In an embodiment, website computing device 1104 provides a recommendation service to recommend services (e.g. hair or hairstyling services). Hair or hairstyle products can comprise shampoo, conditioner, oils, serums, vitamins, minerals, enzymes and other hair or scalp treatment products; colouring agents; sprays, gels, waxes, mousses and other styling products for application to the hair; hair or scalp tools or appliances such as combs, brushes, hair dryers, curling wands, straightening wands, flat irons, scissors, razors, rollers, massaging tools, etc.; and accessories including, clips, hair ties, scrunchies, bands, etc. Hair or hairstyle services can comprise cutting, colouring, styling, straightening or other hair and scalp treatments, hair removal, hair replacement/wig services and consultations for same.

In an embodiment, application 1120A provides an interface to engage the user in a conversational manner to solicit hairstyle, lifestyle, and/or user data, which may include image $I_1$ 1122. In an embodiment, the data is analyzed and a recommendation is generated. A recommendation may comprise a selection of reference images from store 1124. Pairs of reference images may be presented (e.g. a particular recommended $I_2$ with a particular recommended $I_3$) for a whole recommend hairstyle. In some instances the recommended images $I_2$ and $I_3$ are the same image such as where a single image shows both the hair style and structure, and the hair appearance and finer style that is recommended.

In an embodiment, application 1120A provides an interface to receive user provided reference images $I_2$ and $I_3$. For example, the user may locate (or generate such as via a camera) and store to smartphone 1108 examples of hairstyles. The user may upload the reference images (collectively 1128) to website 1104 for use to generate the hairstyle try on as represented in resulting image 1126.

With continued reference to FIG. 11, in an example, a user of tablet 1110 uses a browser and visits a website offered by application distribution computing device 1106. Tablet 1110 receives application 1120B providing access to the network framework 1116. Application 1120B, in an example, is configured similarly to application 1120A. The user uses a camera and obtains a still or video image (1130) (e.g. a selfie), which image is used as image $I_1$ and is communicated for process by GAN generator at cloud computing device 1105. The user of tablet 1110, in the present example, also uploads images $I_2$ and $I_3$ (collectively 1132). Images 1132 may be recommended by application 1120B or user located. The resulting image 1134 is communicated and displayed via display device of tablet 1110 and may be stored to a storage device and shared (communicated) via social media, text message, email, etc.

Application 1120B, in an embodiment, is configured to provide tablet 1110 with one or more interfaces to a service for recommendations and/or purchase facilitation for products and/or services, which may be associated with a hairstyle.

In an example, an application 1120B is a photo gallery application. Hairstyle effects are applied such as to a user image (an instance of image $I_1$) from a participant's camera using the framework 1116. The application 1120B may facilitate the user to choose images $I_2$ and $I_3$. Such as from a data store associated with the photo gallery application (e.g. storage device of tablet 1110) or the internet or other data store (e.g. via a recommendation service).

Thus, in an embodiment network framework 1116 is configured to perform a hairstyle transfer to generate a synthesized image comprising an identify from a first image, a first hair style attribute from a second image and at least one second hair style attribute from a third image. Network framework 1116 is configured to provide editable hairstyle transfer, disentangling features of a) hair shape and structure; and b) hair appearance and hair finer style thereby to permit a choice of hair attribute to transfer. In an embodiment, network framework uses two stage optimization to perform the transfer to disentangle style attributes from one another. In embodiment, network framework generates a synthesized image ($I_G$) and in a first stage of optimization reconstructs an identity from a face of a first image ($I_1$) to a face region of $I_G$; and a hair shape and structure attribute from a hair region of a second image ($I_2$) to a hair region of $I_G$. Further, in a second stage, network framework transfers each of a hair appearance attribute and a finer style attribute from a hair region of a third image ($I_3$) to the hair region of $I_G$ as reconstructed in the first stage. In an embodiment, inpainting fills in a background regions, such as from a background of $I_1$.

In an embodiment, the network framework is configured to perform gradient orthogonalization in the two stage optimization to disentangle the at least one style attribute represented by $I_2$ and the at least one style attribute represented by $I_3$.

In an embodiment, where the style to be transferred is a hairstyle, the at least one style attribute represented by $I_2$ is a hair shape and structure attribute; and the at least one style attribute represented by $I_3$ is i) an appearance attribute and ii) a finer style attribute.

In an embodiment, two stage optimization optimizes losses comprising: an identity reconstruction loss ($L_f$); a hair shape and structure reconstruction loss ($L_r$); an appearance loss ($L_a$); and a finer style loss ($L_s$). In an embodiment, $L_f$ and $L_r$ are first stage optimized without optimizing $L_a$ and $L_s$; and $L_f$, $L_{r'}$, $L_a$ and $L_s$ are second stage optimized where $L_{r'}$ is optimized via gradient orthogonalization to avoid competition between appearance and finer style attributes of $I_2$ with those of $I_3$.

Though the embodiments herein are chiefly described with reference to hairstyle transfer other style transfer may be performed, for multiple style attributes. In accordance with an embodiment, there is provided a method to perform a style transfer using artificial intelligence (AI), the style comprising a plurality of style attributes. The method comprises: processing a plurality of images comprising a first image ($I_1$), a second image ($I_2$) and a third image ($I_3$) using an AI network framework comprising a generative adversarial network (GAN) generator and a two stage optimization to produce a synthesized image ($I_G$) comprising an identity represented by the first image ($I_1$) and a style determined from at least one style attribute represented by the second image ($I_2$) and at least one style attribute represented by the third image ($I_3$). In the method, the network framework is configured to optimize a latent space of the GAN to perform the style transfer while disentangling the at least one style attribute represented by $I_2$ and the at least one style attribute represented by $I_3$. In an embodiment, $I_G$ comprises an identity region, a style region and a background region and, in a first stage according to an objective function to optimize the latent space, the network framework is configured to: reconstruct the identity represented by $I_1$ to the identity region of $I_G$; and reconstruct the at least one style attribute represented by $I_2$ to the style region of $I_G$. In an embodiment, in a second stage according to the objective function, the network framework is configured to transfer respectively each of the at least one style attribute represented by $I_3$ to the style region of $I_G$.

In an embodiment such as for hairstyle transfer, when the identity of $I_1$ is unique between $I_1$, $I_2$ and $I_3$, a complete hairstyle transfer is enabled. In an embodiment such as for hairstyle transfer, when the hair shape and structure of $I_2$ is unique between $I_1$, $I_2$ and $I_3$, at least a hairstyle transfer related to shape and structure is enabled. In an embodiment such as for hairstyle transfer, when the hair appearance of $I_3$ is unique between $I_1$, $I_2$ and $I_3$ at least a hairstyle transfer related to appearance is enabled. In an embodiment such as for hairstyle transfer, when the hair finer style of $I_3$ is unique between $I_1$, $I_2$ and $I_3$ at least a hairstyle transfer related to finer details of hair is enabled.

In an embodiment, the method comprises processing $I_G$, $I_1$, $I_2$ and $I_3$ respectively using a segmentation network to define respective hair (style) masks and face (identity) masks for each image and using selected one of such masks to define respective target masks for transferring the style.

In an embodiment, the GAN generator initially generates $I_G$ as a mean image to receive the style transfer.

In an embodiment, the identity is reconstructed using high-level features extracted by processing $I_1$ using a pretrained neural network encoder. In an embodiment in a hairstyle transfer, hair shape and structure are reconstructed using features from later blocks generated by processing $I_2$ using the pretrained neural network encoder. In an embodiment in a hairstyle transfer, a hair region of $I_2$ is an eroded hair region that places a soft constraint on a target placement of synthesized hair. In an embodiment in a hairstyle transfer, hair appearance is transferred using a global appearance determined from features extracted at a first block by processing $I_3$ using the pretrained neural network encoder, wherein the global appearance is determined without regard to spatial information. In an embodiment in a hairstyle transfer, hair finer style is transferred in accordance with high-level feature maps extracted by processing $I_3$ using the pretrained neural network encoder.

In an embodiment in a hairstyle transfer, hair appearance comprises colour, and hair finer style comprises finer details comprising any of wisp styles and shading variations between hair strands.

In an embodiment, the method comprises providing an interface to an (e-commerce) service with which to purchase a product and/or service associated with style transfer.

In an embodiment, $I_G$ is provided for display in a graphical user interface for comparison with $I_1$.

In an embodiment, the method comprises providing an interface to a service configured to recommend a product and/or service associated with style transfer.

In an embodiment in a hairstyle transfer, the method comprises: providing an interface to receive $I_1$; providing a store of reference images showing respective style attributes, such as in a hairstyle, comprising hair shape and structure; and hair appearance and finer style; providing a selection interface to receive input to define $I_2$ from one of the reference images; and providing a selection interface to receive input to define $I_3$ from one of the reference images. In an embodiment (e.g. in a hairstyle transfer), comprising providing an interface to receive one or both of $I_2$ and $I_3$ from other than the store of reference images.

In an embodiment there is provided a computing device comprising circuitry configured to: provide a network framework to perform a virtual hairstyle try-on relative to an identity image (e.g. $I_1$) and a plurality of reference images (e.g. $I_2$ and $I_3$) representing different hairstyle attributes to simulate a hairstyle on an identity, the network framework configured to perform an optimization that disentangles the different hairstyle attributes to provide realistic synthesized hair when incorporating the identity and hairstyle into a synthesized image (e.g. $I_G$) representing the virtual hairstyle try-on; and provide the synthesized image for presentation. In an embodiment, the circuitry is configured to provide (e.g. at least one of) an interface to purchase a hair or hairstyle product, service or both; and an interface to generate recommendations for such product, service or both.

Conclusion

In accordance with embodiments, the introduction of LOHO, an optimization framework that performs hairstyle transfer on portrait images, takes a step in the direction of spatially-dependent attribute manipulation with pretrained GANs. It is shown that developing algorithms that approach specific synthesis tasks, such as hairstyle transfer, by manipulating the latent space of expressive models trained on more general tasks, such as face synthesis, is effective for completing many downstream tasks without collecting large training datasets. GAN inversion approach is able to solve problems such as realistic hole-filling more effectively, even than feedforward GAN pipelines that have access to large training datasets.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

Incorporated Herein by Reference in their Entireties

[1] Rameen Abdal, Yipeng Qin, and Peter Wonka. Image2stylegan: How to embed images into the stylegan latent space? In 2019 *IEEE/CVF International Conference on Computer Vision (ICCV)*, 2019.

[2] R. Abdal, Y. Qin, and P. Wonka. Image2stylegan++: How to edit the embedded images? In 2020 *IEEE/CVF Conference on Computer Vision and Pattern Recognition (CVPR)*, pages 8293-8302, 2020.

[3] Andrew Brock, Jeff Donahue, and Karen Simonyan. Large scale GAN training for high fidelity natural image synthesis. In *International Conference on Learning Representations*, 2019.

[4] Adrian Bulat and Georgios Tzimiropoulos. How far are we from solving the 2d & 3d face alignment problem? (and a dataset of 230,000 3d facial landmarks). In *International Conference on Computer Vision*, 2017.

[5] Egor Burkov, Igor Pasechnik, Artur Grigorev, and Victor Lempitsky. Neural head reenactment with latent pose descriptors. In *IEEE/CVF Conference on Computer Vision and Pattern Recognition (CVPR)*, June 2020.

[6] Menglei Chai, Linjie Luo, Kalyan Sunkavalli, Nathan Carr, Sunil Hadap, and Kun Zhou. High-quality hair modeling from a single portrait photo. *ACM Transactions on Graphics*, 34:1-10, 10 2015.

[7] Menglei Chai, Lvdi Wang, Yanlin Weng, Xiaogang Jin, and Kun Zhou. Dynamic hair manipulation in images and videos. *ACM Transactions on Graphics (TOG)*, 32, 07 2013.

[8] Menglei Chai, Lvdi Wang, Yanlin Weng, Yizhou Yu, Baining Guo, and Kun Zhou. Single-view hair modeling for portrait manipulation. *ACM Transactions on Graphics*, 31, 07 2012.

[9] Caroline Chan, Shiry Ginosar, Tinghui Zhou, and Alexei A Efros. Everybody dance now. In *IEEE International Conference on Computer Vision (ICCV)*, 2019.

[10] L. A. Gatys, A. S. Ecker, and M. Bethge. Image style transfer using convolutional neural networks. In 2016 *IEEE Conference on Computer Vision and Pattern Recognition (CVPR)*, pages 2414-2423, 2016.

[11] Ke Gong, Yiming Gao, Xiaodan Liang, Xiaohui Shen, Meng Wang, and Liang Lin. Graphonomy: Universal human parsing via graph transfer learning. In CVPR, 2019.

[12] Ian J. Goodfellow, Jean Pouget-Abadie, Mehdi Mirza, Bing Xu, David Warde-Farley, Sherjil Ozair, Aaron Courville, and Yoshua Bengio. Generative adversarial nets. In *Proceedings of the 27th International Conference on Neural Information Processing Systems—Volume 2*, NIPS'14, page 2672-2680, 2014.

[13] Shanyan Guan, Ying Tai, Bingbing Ni, Feida Zhu, Feiyue Huang, and Xiaokang Yang. Collaborative learning for faster stylegan embedding, 2020.

[14] Martin Heusel, Hubert Ramsauer, Thomas Unterthiner, Bernhard Nessler, and Sepp Hochreiter. Gans trained by a two time-scale update rule converge to a local nash equilibrium. In I. Guyon, U. V. Luxburg, S. Bengio, H. Wallach, R. Fergus, S. Vishwanathan, and R. Garnett, editors, *Advances in Neural Information Processing Systems*, volume 30, pages 6626-6637. Curran Associates, Inc., 2017.

[15] P. Isola, J. Zhu, T. Zhou, and A. A. Efros. Image-to-image translation with conditional adversarial networks. In 2017 *IEEE Conference on Computer Vision and Pattern Recognition (CVPR)*, pages 5967-5976, 2017.

[16] Youngjoo Jo and Jongyoul Park. Sc-fegan: Face editing generative adversarial network with user's sketch and color. In *The IEEE International Conference on Computer Vision (ICCV)*, October 2019.

[17] Justin Johnson, Alexandre Alahi, and Li Fei-Fei. Perceptual losses for real-time style transfer and super-resolution. In *European Conference on Computer Vision*, 2016.

[18] Tero Karras, Timo Aila, Samuli Laine, and Jaakko Lehtinen. Progressive growing of gans for improved quality, stability, and variation. In *International Conference on Learning Representations*, 2017.

[19] T. Karras, S. Laine, and T. Aila. A style-based generator architecture for generative adversarial networks. In 2019 *IEEE/CVF Conference on Computer Vision and Pattern Recognition (CVPR)*, 2019.

[20] Tero Karras, Samuli Laine, Miika Aittala, Janne Hellsten, Jaakko Lehtinen, and Timo Aila. Analyzing and improving the image quality of StyleGAN. In *Proc. CVPR*, 2020.

[21] Vladimir Kim, Ersin Yumer, and Hao Li. Real-time hair rendering using sequential adversarial networks. In *European Conference on Computer Vision*, 2018.

[22] Diederik P. Kingma and Jimmy Ba. Adam: A method for stochastic optimization. In *International Conference on Learning Representations*, 2015.

[23] Cheng-Han Lee, Ziwei Liu, Lingyun Wu, and Ping Luo. Maskgan: Towards diverse and interactive facial image manipulation. In *IEEE Conference on Computer Vision and Pattern Recognition (CVPR)*, 2020.

[24] J. Li, X. Liang, Y. Wei, T. Xu, J. Feng, and S. Yan. Perceptual generative adversarial networks for small object detection. In 2017 *IEEE Conference on Computer Vision and Pattern Recognition (CVPR)*, pages 1951-1959, 2017.

[25] T. Park, M. Liu, T. Wang, and J. Zhu. Semantic image synthesis with spatially-adaptive normalization. In 2019 *IEEE/CVF Conference on Computer Vision and Pattern Recognition (CVPR)*, pages 2332-2341, 2019.

[26] Stanislav Pidhorskyi, Donald A Adjeroh, and Gianfranco Doretto. Adversarial latent autoencoders. In *Proceedings of the IEEE Computer Society Conference on Computer Vision and Pattern Recognition (CVPR)*, 2020. [to appear]

[27] Elad Richardson, Yuval Alaluf, Or Patashnik, Yotam Nitzan, Yaniv Azar, Stay Shapiro, and Daniel Cohen-Or. Encoding in style: a stylegan encoder for image-to-image translation. *arXiv preprint arXiv:* 2008.00951, 2020.

[28] Karen Simonyan and Andrew Zisserman. Very deep convolutional networks for large-scale image recognition. In *International Conference on Learning Representations*, 2015.

[29] C. Szegedy, V. Vanhoucke, S. Ioffe, J. Shlens, and Z. Wojna. Rethinking the inception architecture for computer vision. In 2016 *IEEE Conference on Computer Vision and Pattern Recognition (CVPR)*, pages 2818-2826, 2016.

[30] Zhentao Tan, Menglei Chai, Dongdong Chen, Jing Liao, Qi Chu, Lu Yuan, Sergey Tulyakov, and Nenghai Yu. Michigan: Multi-input-conditioned hair image generation for portrait editing. *ACM Transactions on Graphics (TOG)*, 39(4):1-13, 2020.

[31] A. Tao, K. Sapra, and Bryan Catanzaro. Hierarchical multi-scale attention for semantic segmentation. *ArXiv, abs/*2005.10821, 2020.

[32] T. Wang, M. Liu, J. Zhu, A. Tao, J. Kautz, and B. Catanzaro. High-resolution image synthesis and semantic manipulation with conditional gans. In 2018 *IEEE/CVF Conference on Computer Vision and Pattern Recognition*, pages 8798-8807, 2018.

[33] Ting-Chun Wang, Ming-Yu Liu, Andrew Tao, Guilin Liu, Jan Kautz, and Bryan Catanzaro. Few-shot video-to-video synthesis. In Advances in *Neural Information Processing Systems (NeurIPS)*, 2019.

[34] Ting-Chun Wang, Ming-Yu Liu, Jun-Yan Zhu, Guilin Liu, Andrew Tao, Jan Kautz, and Bryan Catanzaro. Video-to-video synthesis. In *Conference on Neural Information Processing Systems (NeurIPS)*, 2018.

[35] Yanlin Weng, Lvdi Wang, Xiao Li, Menglei Chai, and Kun Zhou. Hair interpolation for portrait morphing. *Computer Graphics Forum*, 32, 10 2013.

[36] J. Yu, Z. Lin, J. Yang, X. Shen, X. Lu, and T. Huang. Freeform image inpainting with gated convolution. In 2019 *IEEE/CVF International Conference on Computer Vision (ICCV)*, pages 4470-4479, 2019.

[37] Yuhui Yuan, Xilin Chen, and Jingdong Wang. Object-contextual representations for semantic segmentation. In *Computer Vision—ECCV* 2020, pages 173-190, 2020.

[38] E. Zakharov, A. Shysheya, E. Burkov, and V. Lempitsky. Few-shot adversarial learning of realistic neural talking head models. In 2019 *IEEE/CVF International Conference on Computer Vision (ICCV)*, pages 9458-9467, 2019.

[39] Richard Zhang, Phillip Isola, Alexei A Efros, Eli Shechtman, and Oliver Wang. The unreasonable effectiveness of deep features as a perceptual metric. In *CVPR*, 2018.

[40] J. Zhu, T. Park, P. Isola, and A. A. Efros. Unpaired image-to-image translation using cycle-consistent adversarial networks. In 2017 *IEEE International Conference on Computer Vision (ICCV)*, pages 2242-2251, 2017.

[41] Jiapeng Zhu, Yujun Shen, Deli Zhao, and Bolei Zhou. In-domain gan inversion for real image editing. In *Proceedings of European Conference on Computer Vision (ECCV)*, 2020.

What is claimed is:

1. A method to perform a style transfer of a style using artificial intelligence (AI), the style comprising a plurality of style attributes, the method comprising:
   processing a plurality of images comprising a first image (I1), a second image (I2) and a third image (I3) using an AI network framework comprising a generative adversarial network (GAN) generator and a two stage optimization to generate a synthesized image (IG) comprising an identity represented by the first image (I1) and a style determined from at least one style attribute represented by the second image (I2) and at least one style attribute represented by the third image (I3);
   wherein the AI network framework is configured to optimize a latent space of a GAN model to perform the style transfer while disentangling the at least one style attribute represented by the second image (I2) and the at least one style attribute represented by the third image (I3); and
   wherein the network framework performs gradient orthogonalization in the two stage optimization to disentangle the at least one style attribute represented by second image (I2) and the at least one style attribute represented by the third image (I3).

2. The method of claim 1, wherein IG comprises an identity region, a style region and a background region and wherein, in a first stage according to an objective function to optimize the latent space, the network framework is configured to
   reconstruct the identity represented by I1 to the identity region of IG; and
   reconstruct the at least one style attribute represented by I2 to the style region of IG.

3. The method of claim 2, wherein, in a second stage according to the objective function, the AI network framework is configured to:
   transfer respectively each of the at least one style attribute represented by I3 to the style region of IG.

4. The method of claim 1, wherein:
   the style is a hairstyle;
   the at least one style attribute represented by I2 is a hair shape and structure attribute;
   the at least one style attribute represented by I3 is i) an appearance attribute and ii) a finer style attribute.

5. The method of claim 1, wherein the network framework is configured to provide editable hairstyle transfer, disentangling features of a) hair shape and structure; and b) hair appearance and hair finer style thereby to permit a choice of hair attribute to transfer.

6. The method of claim 5, wherein any of:
   the identity of I1 is unique between I1, I2 and I3, thereby to perform a complete hairstyle transfer;
   the hair shape and structure of I2 is unique between I1, I2 and I3, thereby to perform at least a hairstyle transfer related to shape and structure;
   the hair appearance of I3 is unique between I1, I2 and I3 thereby to perform at least a hairstyle transfer related to appearance; and
   the hair finer style of I3 is unique between I1, I2 and I3 thereby to perform at least a hairstyle transfer related to finer details of hair.

7. The method of claim 1 comprising:
   processing IG, I1, I2 and I3 respectively using a segmentation network to define respective hair masks and face masks for each image and using selected one of such masks to define respective target masks for transferring the style.

8. The method of claim 1, wherein: the GAN generator initially generates IG as a mean image to receive the style transfer; the identity is reconstructed using high-level features extracted by processing I1 using a pretrained neural network encoder; and, in a hairstyle transfer, hair shape and structure are reconstructed using features from later blocks generated by processing I2 using the pretrained neural network encoder.

9. The method of claim 1, wherein in a hairstyle transfer, hair appearance comprises colour, and hair finer style comprises finer details comprising any of wisp styles and shading variations between hair strands.

10. The method of claim 1, wherein the method comprises any of providing an interface to an e-commerce service with which to purchase a hair or hairstyle product, a hair or hairstyle service or both such product and service; and providing an interface to recommend such product, service or both.

11. The method of claim 1, wherein the IG is provided for display in a graphical user interface for comparison with I1.

12. The method of claim 1, comprising:
   providing an interface to receive I1;
   providing a store of reference images showing respective style attributes, including a hairstyle, comprising hair shape and structure, and hair appearance and finer style;
   providing a selection interface to receive input to define I2 from one of the reference images; and
   providing a selection interface to receive input to define I3 from one of the reference images.

13. A computing device comprising a processor and a storage device storing computer-readable instructions that, when executed by the processor, cause the computing device to:
   transfer a hairstyle via an artificial intelligence (AI) network framework comprising a generative adversarial network (GAN) generator that generates a synthesized image (IG) comprising transferred hair attributes from reference images to an identity from a face of a first image (I1), the hair attributes comprising i) hair shape and structure, ii) a hair appearance and iii) a hair finer style;
   wherein the network framework is configured to optimize a latent space to disentangle the hair attributes i) hair shape and structure from ii) hair appearance and iii) hair finer style; and
   wherein the GAN generator is trained using two-stage optimization and gradient orthogonalization to enable the latent space optimization to disentangle the hair attributes.

14. The computing device of claim 13, wherein
   the reference images comprise a second image (I2) and a third image (I3);
   each of I1, I2 and I3 comprise portrait images; and
   the network framework uses the hair shape and structure extracted from I2; and each of hair appearance and hair finer style respectively extracted from I3.

15. The computing device of claim 13, wherein the instructions when executed cause the computing device to provide one or both of: an interface to an e-commerce service with which to purchase a product and/or service associated with a hairstyle; and an interface to recommend a hair or hairstyle product, a hair or hairstyle service or both of such product and service.

16. The computing device of claim 13, wherein the instructions when executed cause the computing device to:
provide an interface to receive I1;
provide a store of reference images showing respective hair attributes;
provide a selection interface to receive input to select at least one reference image to define the hair attributes for the hairstyle transfer.

17. A computing device comprising circuitry that, when operated, causes the computing device to:
provide a network framework to perform a virtual hairstyle try-on relative to an identity image and a plurality of reference images representing different hairstyle attributes to simulate a hairstyle on an identity, the network framework configured to perform an optimization that disentangles the different hairstyle attributes to provide realistic synthesized hair when incorporating the identity and hairstyle into a synthesized image representing the virtual hairstyle try-on; and
provide the synthesized image for presentation;
wherein the network framework is trained using two-stage optimization and gradient orthogonalization to enable the latent space optimization to disentangle the hair attributes.

18. The computing device of claim 17, wherein the circuitry, when operated, causes the computing device to at least one of:
provide an interface to purchase a hair or hairstyle product, hair or hairstyle service or both of such product and service; and
provide an interface to generate hair or hairstyle recommendations.

* * * * *